(12) United States Patent
Huang et al.

(10) Patent No.: US 10,456,724 B2
(45) Date of Patent: Oct. 29, 2019

(54) MELT SPUN FILTRATION MEDIA FOR RESPIRATORY DEVICES AND FACE MASKS

(71) Applicant: E I DU PONT DE NEMOURS AND COMPANY, Wilmington, DE (US)

(72) Inventors: Tao Huang, Downingtown, PA (US); Neil Jay Croft, Jr., Middletown, DE (US); Zachary R. Dilworth, Wilmington, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 15/528,218

(22) PCT Filed: Nov. 20, 2015

(86) PCT No.: PCT/US2015/061896
§ 371 (c)(1),
(2) Date: May 19, 2017

(87) PCT Pub. No.: WO2016/081850
PCT Pub. Date: May 26, 2016

(65) Prior Publication Data
US 2017/0361254 A1 Dec. 21, 2017

Related U.S. Application Data

(60) Provisional application No. 62/082,664, filed on Nov. 21, 2014.

(51) Int. Cl.
*B01D 39/16* (2006.01)
*D04H 1/4291* (2012.01)
(Continued)

(52) U.S. Cl.
CPC .......... *B01D 39/1623* (2013.01); *A41D 13/11* (2013.01); *A62B 23/02* (2013.01);
(Continued)

(58) Field of Classification Search
CPC .. A41D 13/11; A62B 23/02; B01D 2239/025; B01D 2239/0435; B01D 2239/064;
(Continued)

(56) References Cited

U.S. PATENT DOCUMENTS 4,340,563 A    7/1982  Appel et al.
5,993,943 A *  11/1999 Bodaghi ............... D01D 5/0985
                                                        428/198

(Continued)

FOREIGN PATENT DOCUMENTS

EP     2412407 A1    2/2012
JP   2010534559 A   11/2010
(Continued)

OTHER PUBLICATIONS

International Search Report, dated Mar. 11, 2016, for International application No. PCT/US2015/061896, filed Nov. 20, 2015, International Application, Korean Intellectual Property Office, Republic of Korea.

*Primary Examiner* — Arti Singh-Pandey

(57) ABSTRACT

The present disclosure is directed toward an improved nanofibrous electret filtration media of which the standalone electret nanofibrous web comprises a single source randomly intermingled fiber network that yields high breathability due to the high porosity and improved filtration efficiency for use as improved filtration media for respiratory devices and face masks.

18 Claims, 8 Drawing Sheets

(51) Int. Cl.

| | |
|---|---|
| *D04H 1/4382* | (2012.01) |
| *D04H 1/724* | (2012.01) |
| *A41D 13/11* | (2006.01) |
| *A62B 23/02* | (2006.01) |
| *D01D 4/02* | (2006.01) |
| *D01D 5/00* | (2006.01) |
| *D01D 5/098* | (2006.01) |
| *D01D 5/12* | (2006.01) |
| *D01D 5/26* | (2006.01) |
| *D01D 7/00* | (2006.01) |
| *D04H 1/728* | (2012.01) |
| *D04H 3/007* | (2012.01) |
| *D04H 3/16* | (2006.01) |
| *D04H 5/08* | (2012.01) |
| *D01D 5/18* | (2006.01) |
| *D01D 10/00* | (2006.01) |

(52) U.S. Cl.
CPC .............. *D01D 4/02* (2013.01); *D01D 4/025* (2013.01); *D01D 5/0023* (2013.01); *D01D 5/0985* (2013.01); *D01D 5/12* (2013.01); *D01D 5/18* (2013.01); *D01D 5/26* (2013.01); *D01D 7/00* (2013.01); *D01D 10/00* (2013.01); *D04H 1/4291* (2013.01); *D04H 1/4382* (2013.01); *D04H 1/724* (2013.01); *D04H 1/728* (2013.01); *D04H 3/007* (2013.01); *D04H 3/16* (2013.01); *D04H 5/08* (2013.01); *B01D 2239/025* (2013.01); *B01D 2239/0435* (2013.01); *B01D 2239/064* (2013.01); *B01D 2239/1208* (2013.01); *B01D 2239/1216* (2013.01); *B01D 2239/1233* (2013.01); *B01D 2239/1258* (2013.01); *B01D 2239/1291* (2013.01)

(58) Field of Classification Search
CPC .... B01D 2239/1208; B01D 2239/1216; B01D 2239/1233; B01D 2239/1258; B01D 2239/1291; B01D 39/1623; D01D 10/00; D01D 4/02; D01D 4/025; D01D 5/0023; D01D 5/0985; D01D 5/12; D01D 5/18; D01D 5/26; D01D 7/00; D04H 1/4291; D04H 1/4382; D04H 1/724; D04H 1/728; D04H 3/007; D04H 3/16; D04H 5/08
See application file for complete search history.

(56) References Cited

U.S. PATENT DOCUMENTS

| | | | |
|---|---|---|---|
| 6,375,886 | B1 | 4/2002 | Angadjivand et al. |
| 8,277,711 | B2 | 11/2012 | Huang et al. |
| 8,523,971 | B2 | 9/2013 | Leung et al. |
| 2006/0096260 | A1* | 5/2006 | Bryner ............... B01D 39/1623 55/486 |
| 2008/0023888 | A1 | 1/2008 | Brang et al. |
| 2008/0242171 | A1* | 10/2008 | Huang ................ D01D 5/0023 442/51 |
| 2014/0120322 | A1 | 5/2014 | Fu et al. |
| 2015/0111455 | A1 | 4/2015 | Huang et al. |

FOREIGN PATENT DOCUMENTS

| | | | | |
|---|---|---|---|---|
| WO | 2003/080905 | A1 | 10/2003 | |
| WO | WO-2004027140 | A1 * | 4/2004 | ............ A41D 31/02 |
| WO | 2009014539 | A1 | 1/2009 | |
| WO | 2013/096672 | A1 | 6/2013 | |

* cited by examiner

MELT SPUN FILTRATION MEDIA FOR RESPIRATORY DEVICES AND FACE MASKS

CROSS-REFERENCE TO RELATED PATENT APPLICATIONS

This patent claims priority under 35 USC § 371 as a national phase of Int'l Patent Appl. PCT/US15/61896 (filed Nov. 20, 2015; and published on May 26, 2016 as Int'l Publ. No. WO2016/081850), which, in turn, claims priority to U.S. Patent Appl. 62/082,664 (filed Nov. 21, 2014). The entire texts of the above-referenced patent applications are incorporated by reference into this patent.

FIELD OF THE INVENTION

This invention relates to a nonwoven, nanofibrous web; and, more particularly, to a nanofibrous web useful as a filtration media in respiratory devices and face masks.

BACKGROUND

Fabric sheets and nonwoven webs have been used as air filtration elements in dust-protective face masks for consumer and industrial use, respiratory protection devices, and medical devices (e.g., surgical, dental, medical procedure, isolation, and laser masks). Various types of face masks and respirators available to the general public and industrial workers are worn for protection against inhalation of dust, pollutants, allergens, pathogenic organisms, and other deleterious particulate materials.

Factors related to the protective efficiencies observed with face masks and respirators include the penetration efficiency and particle loading characteristics of the filtration materials. Also important is the fit of the face mask or respirator. Protection from dust, allergens, and infectious aerosols by face masks and respirators is dependent on the aerosol concentration of the compound and the infectious or inhaled dose. However, use of conventional face masks and respirators may not provide as much protection as desired against inhaled aerosols.

The filtration efficiency of nonwoven media can be influenced to some extent by the types of fibers used and their configuration. Nanofibrous media have been considered for their potential to improve the filtration efficiency over that of media made with larger fibers, because a smaller pore size might be expected from use of fibers with smaller diameter. On other hand, another measure of filter performance is the resistance or pressure drop, which ordinarily increases as pore size decreases. A higher resistance makes face masks less breathable and less comfortable.

In addition, known nanofiber media are typically soft and fragile, so they are not self-supporting and thus cannot be used alone as air filtration elements. Thus, present nanofibers are typically coated or otherwise supported on a more robust substrate to form a composite that can be handled readily in the course of manufacturing, transport, and use. The substrate is commonly a separate, non-woven microfiber medium. Nanofibers used for the coating can be produced by either electrospinning or melt-blown processes. Although electrospinning in some cases can produce small diameter fibers, the production rate is ordinarily so low that the ultimate cost is prohibitive. Melt blown nanofibers are also relatively expensive when compared to standard filter media. Even islands-in-the-sea nanofibers, which can be produced at high rates, are costly to produce because they require a removable sea that must be removed in a separate process step. Melt blown nanofiber processes or melt film fibrillation process that randomly lay down fibers do not provide adequate uniformity at sufficiently high throughputs for most end use applications.

Nanofibers have been considered for use in face masks, e.g. as a coating layer on a substrate or laminated with a substrate or as a nanofiber layer structure. Although the resulting nanofiber webs in some instances have good filtration efficiency, they typically exhibit a very high resistance (pressure drop) which signals poor breathability and less comfort for the mask wearer.

What is needed is a low-cost filtration media that can be incorporated in face masks, respirators, and similar personal protection devices that can efficiently trap tiny particles, while providing desirable breathability and user comfort. Ideally, protective equipment constructed with such media would be suitable for filtering ambient bacteria, pollen, virus-containing small particle aerosols, and dusts emitted by industrial processes or from other natural sources.

SUMMARY

In an aspect, the present disclosure provides a nanofibrous web comprising polymeric fibers that are intimately comingled and entangled in a single layer, stand-alone network, and wherein:

(a) the fibers comprise at least 70% nanofibers, 5%-25% microfibers, and 0%-5% coarse fibers by number percentage;

(b) a number average diameter of all the fibers is less than 1000 nm and a median diameter of all the fibers is less than 500 nm; and (c) the nanofibrous web has an apparent density of 0.01 to 0.05 g/cm$^3$, an electrostatic charge of at least 12 kV as measured at a distance of 25 mm, and an effective quality factor (eQF) of greater than about 2.5 (Pa·g/cm$^3$)$^{-1}$.

Another aspect provides a filtration element comprising the foregoing nanofibrous web Further provided is a respiratory device, such as a face mask or a respirator, comprising such a filtration element. The filtration element may also be incorporated in a filtration cartridge configured for attachment to a respiratory device.

Still another aspect provides a process for producing a nanofibrous web. The process comprises:

(i) supplying a molten polymeric spinning melt to a surface of a rotating member having a discharge edge;

(ii) rotating the rotating member at a rotational speed sufficient to form a film of the melt on the member, the film having an instability characterized by a wavy, non-uniform film thickness having regions of undulating thickness that extend radially outward from the center of the rotating member to its edge;

(iii) discharging from the discharge edge a plurality of discrete, continuous filaments derived from the film melt into a stretching zone;

(iv) attenuating the discharged discrete filaments in the stretching zone by centrifugal force to form continuous fibers;

(v) electrostatically charging the filaments in the stretching zone; and (vi) collecting the attenuated continuous fibers on a collection surface to form the nanofibrous web as a single layer, stand-alone network, In this process, the fibers comprise at least 70% nanofibers, 5%-25% microfibers, and 0%-5% coarse fibers by number percentage, and a number average diameter of all the fibers is less than 1000 nm and a median diameter of all the fibers is less than 500 nm.

BRIEF DESCRIPTION OF THE DRAWINGS

The invention will be more fully understood and further advantages will become apparent when reference is made to the following detailed description of certain preferred embodiments of the invention and the accompanying drawings, wherein like reference numerals denote similar elements throughout the several views and in which.

DETAILED DESCRIPTION

Definitions

Figure 1:
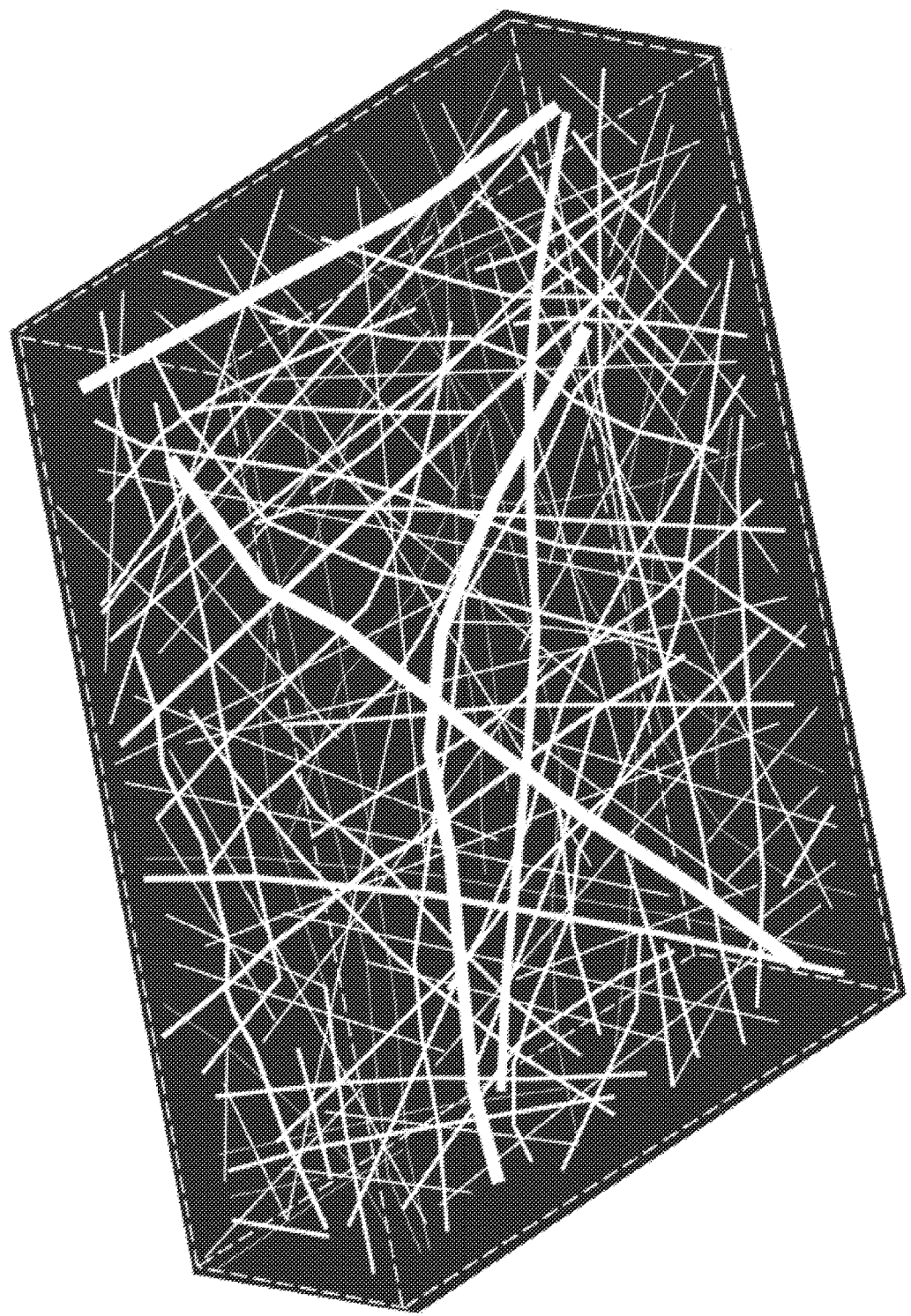
FIG. 1 is a schematic, perspective view of the configuration of nanofibers and microfibers within a web according to the present disclosure.
Figure 2:
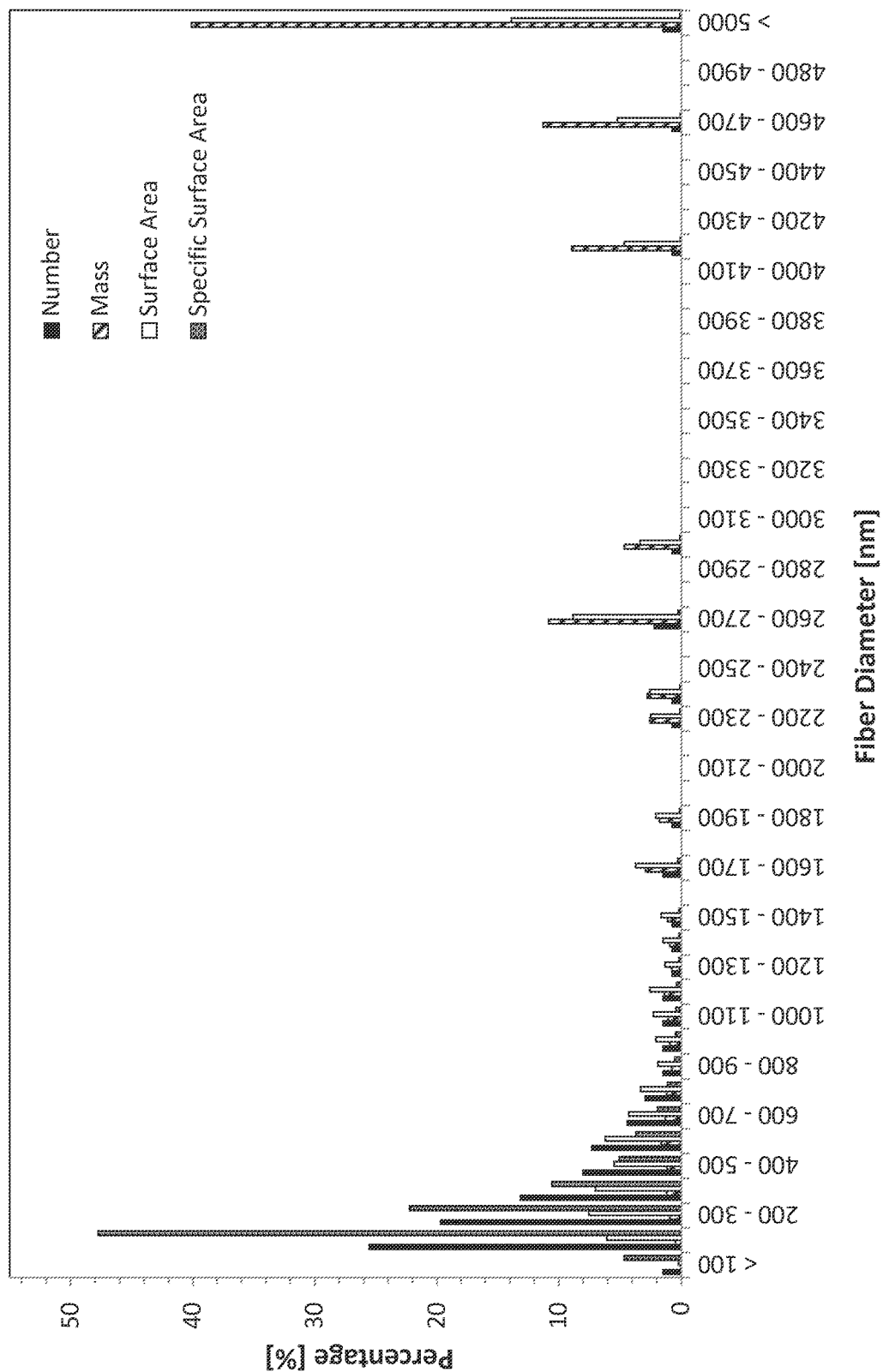
FIG. 2 shows the fiber diameter distribution in terms of the number percentage, the surface area percentage, the specific surface area percentage and the mass percentage within the web of Example 1 described hereinbelow.
Figure 3:
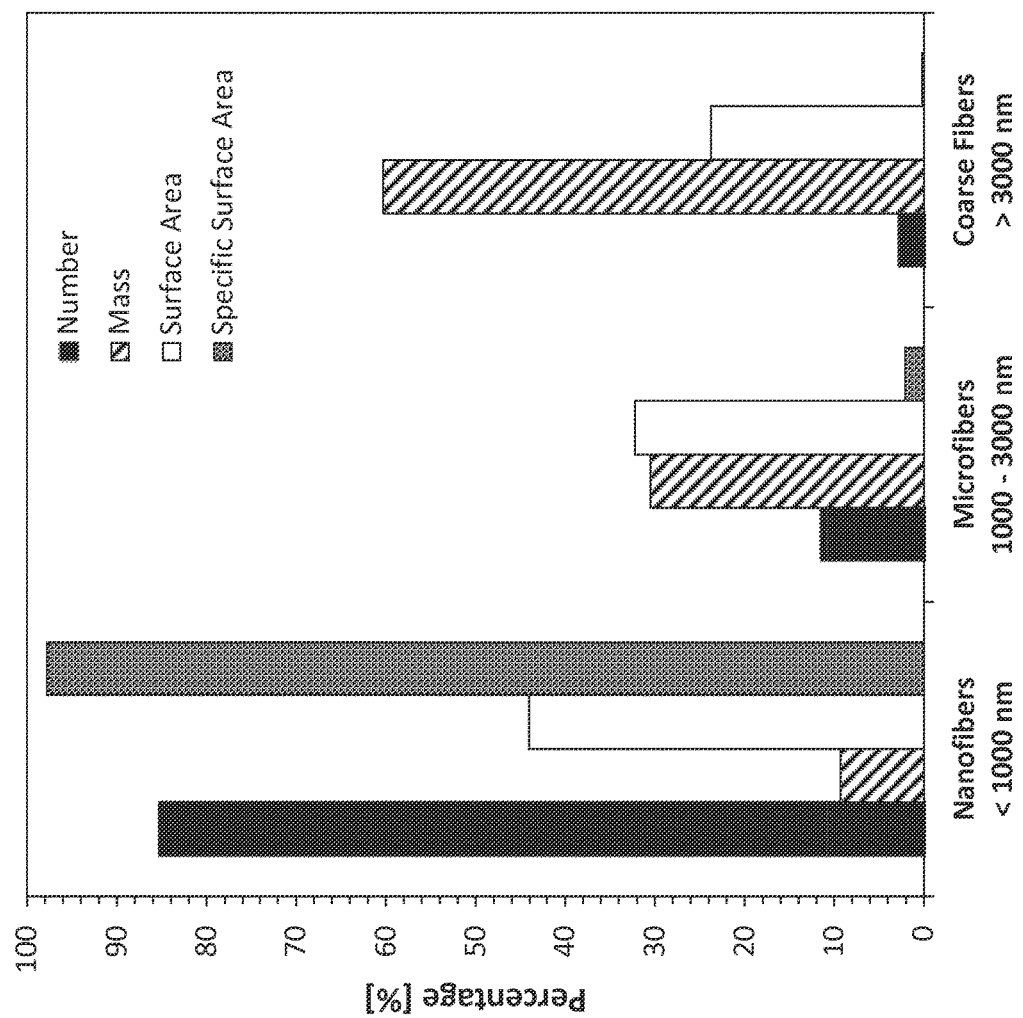
FIG. 3 shows the number percentage, the surface area percentage, the specific surface area percentage and the mass percentage in terms of the nanofibers, microfibers and coarse fibers within the web of Example 1 described hereinbelow.
Figure 4:
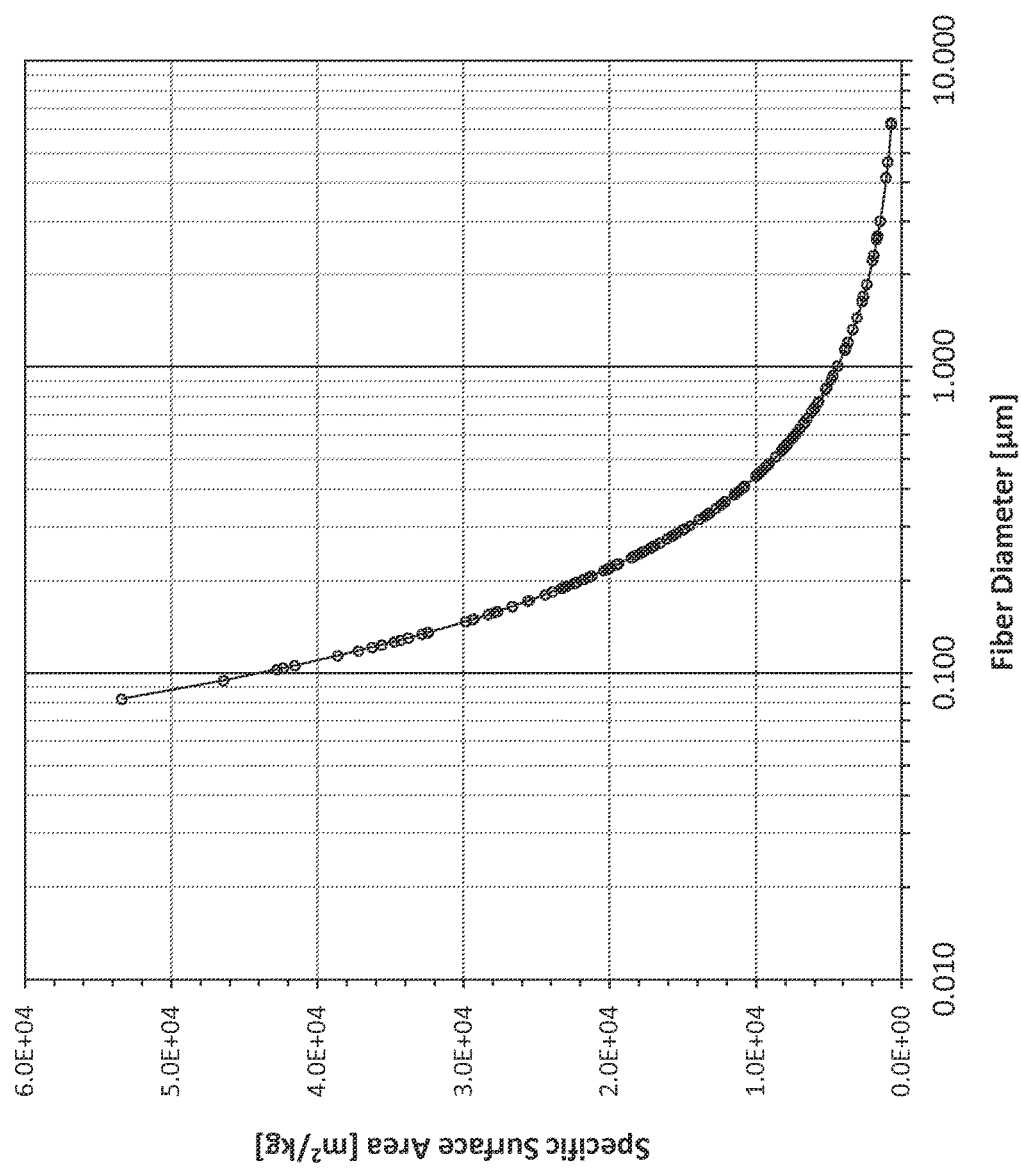
FIG. 4 is the plot of the specific surface area as function of fiber diameter of the web of Example 1 described hereinbelow.
Figure 5:
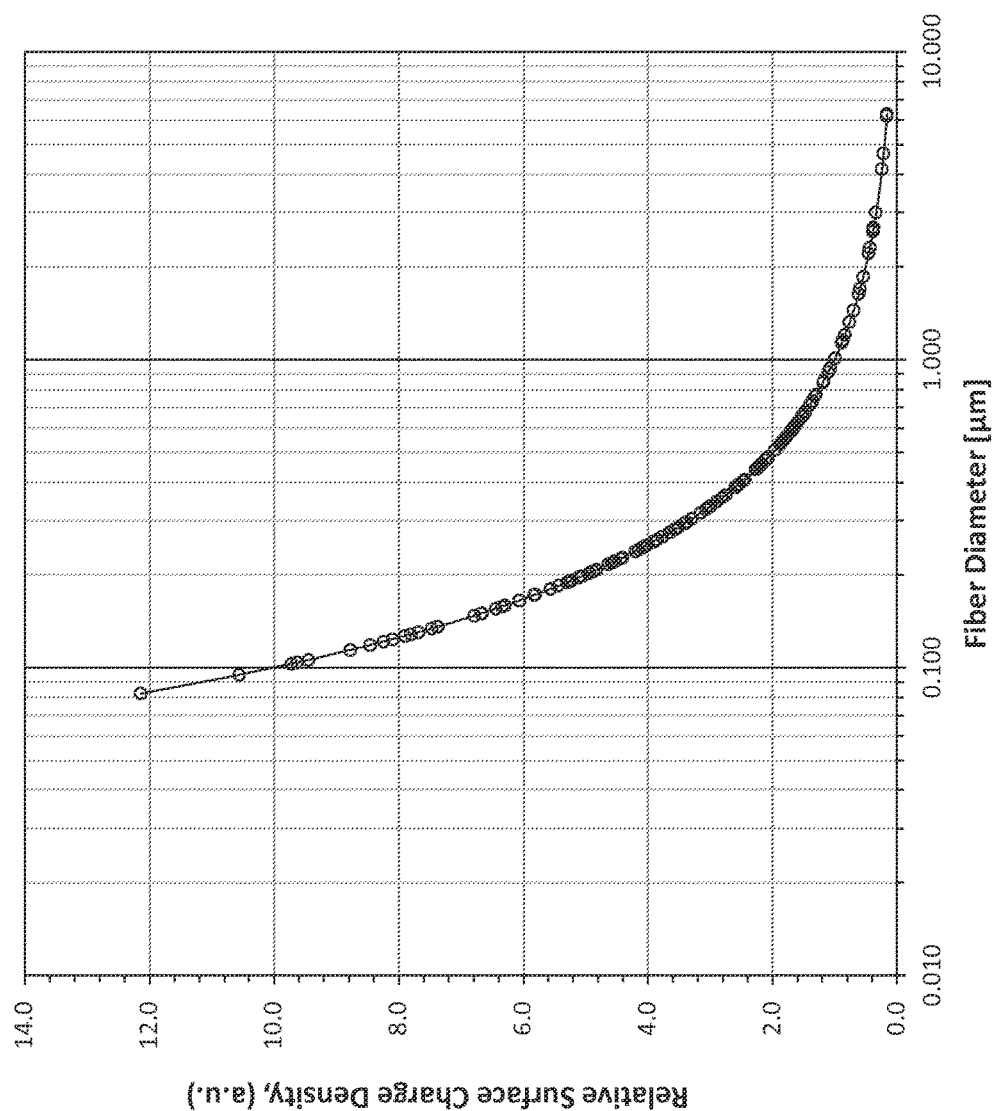
FIG. 5 is the plot of the relative surface charge density as function of fiber diameter of the web of Example 1 described hereinbelow.
Figure 6:
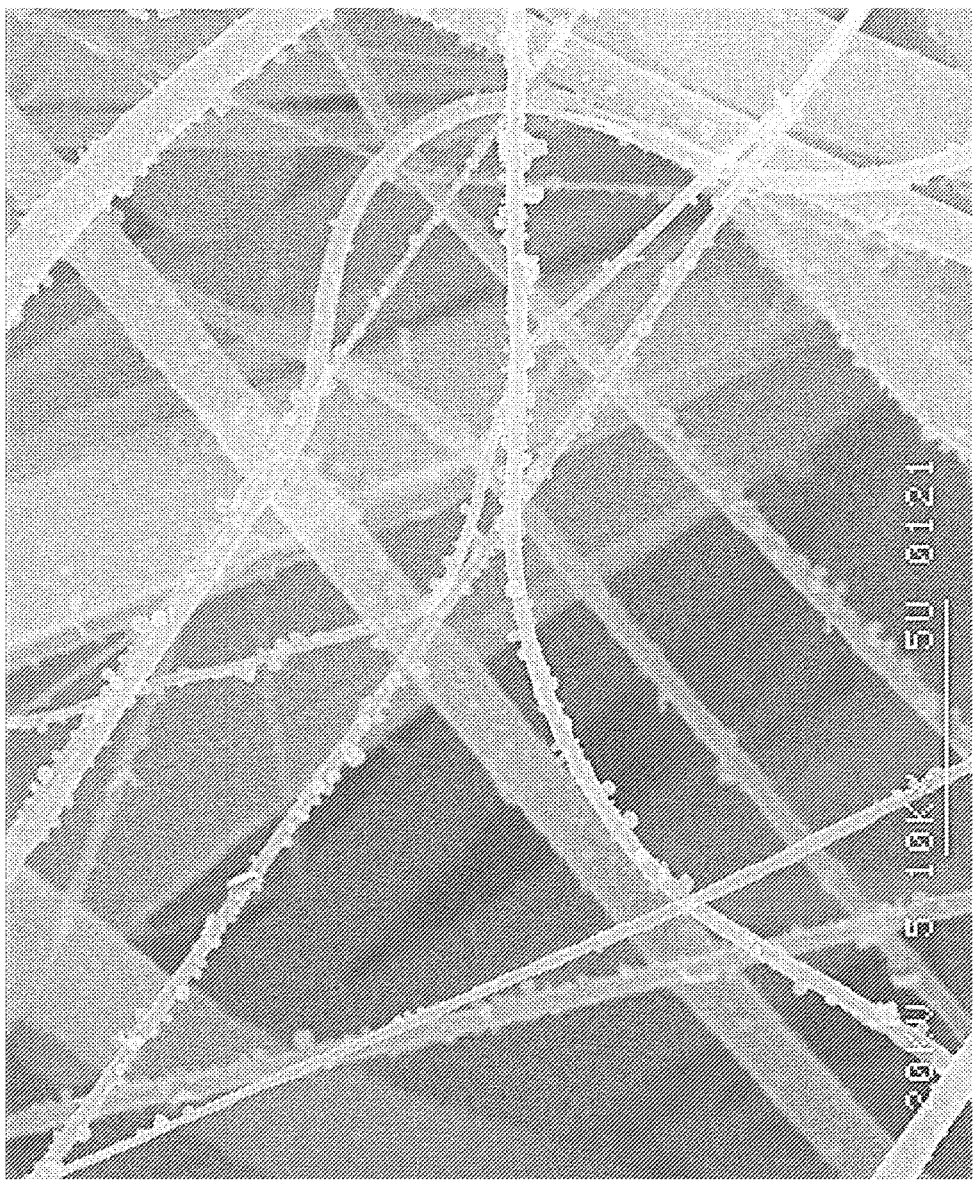
FIG. 6 is scanning electron (SEM) micrograph showing the particles captured by the nanofibers and microfibers in the web of Example 1 described hereinbelow, after the TSI initial filtration test.
Figure 7:
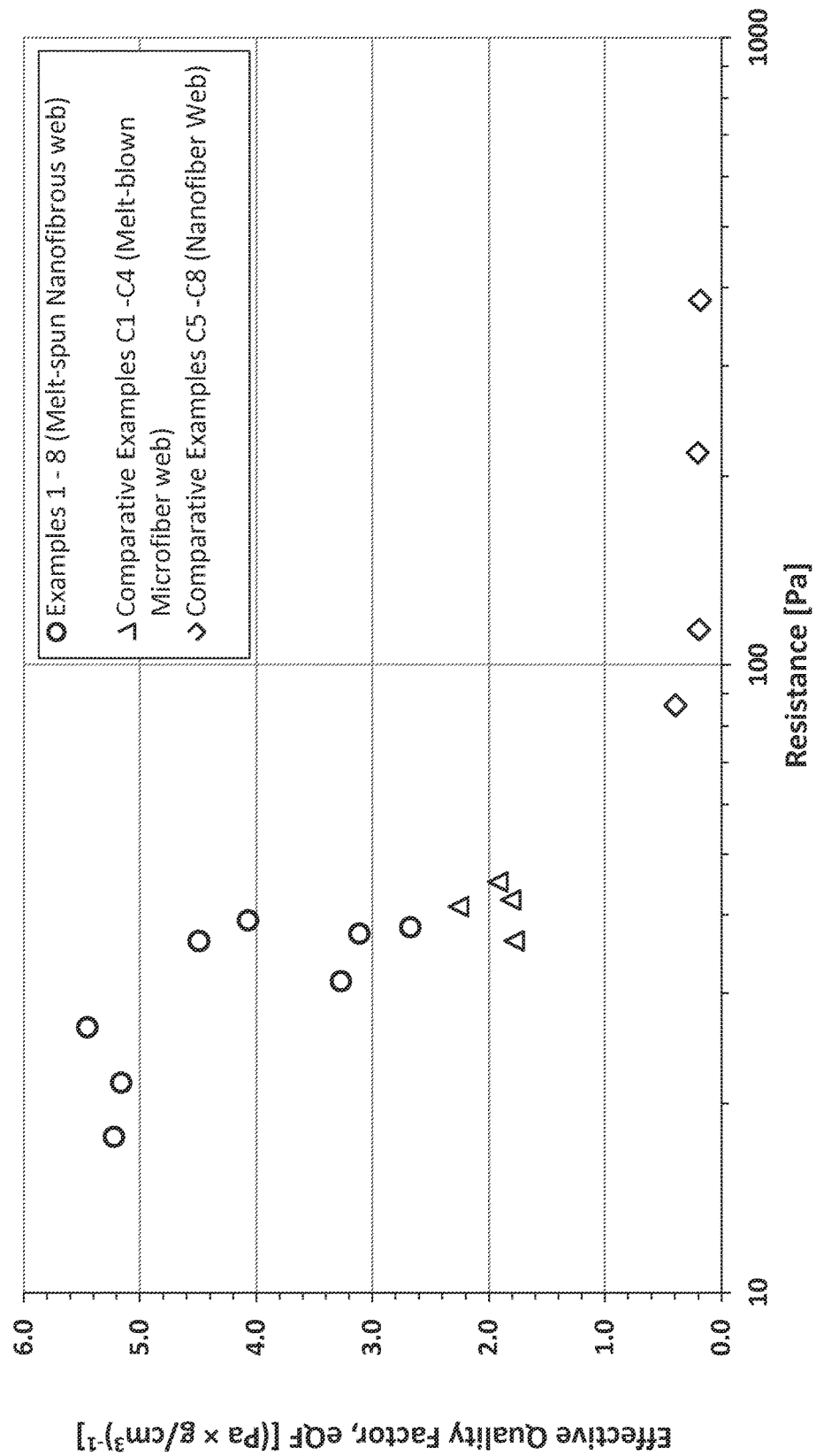
FIG. 7 is a graph showing the relationship between effective quality factor and resistance for the webs of the Examples and Comparative Examples described hereinbelow.

The term "web" as used herein refers to layer of a network of fibers commonly made into a nonwoven.

The term "nonwoven" as used herein refers to a web of a multitude of essentially randomly oriented fibers where no overall repeating structure can be discerned by the naked eye in the arrangement of fibers. The fibers can be bonded to each other, or can be unbounded and entangled to impart strength and integrity to the web. The fibers can be staple fibers or continuous fibers, and can comprise a single material or a multitude of materials, either as a combination of different fibers or as a combination of similar fibers each comprising of different materials.

The term "nanofibrous web" as used herein refers to a web constructed predominantly of nanofibers. "Predominantly" means that greater than 50% of the fibers by number percentage in the web are nanofibers.

The term "nanofibers" as used herein refers to fibers having a diameter less than 1000 nm. In the case of non-round cross-sectional fibers, the term "diameter" as used herein refers to the greatest cross-sectional dimension.

The term "melt-spun nanofibers" as used herein refers to nanofibers made from a centrifugal melt spinning process, e.g., the process disclosed by U.S. Pat. No. 8,277,711

The term "melt-spun nanofibrous web" as used herein refers to a nanofibrous web made of melt-spun nanofibers.

The term "melt-blown nanofibers" as used herein refers to nanofibers made using a melt blowing process, e.g., the process disclosed by US 2008/0023888.

The term "melt-blown nanofibrous web" as used herein refers to a nanofibrous web made of melt-blown nanofibers.

The term "electroblown nanofibers" as used herein refers to nanofibers made from an electroblowing process, e.g., the process disclosed by WO 2003/080905.

The term "electroblown nanofibrous web" as used herein refers to a nanofibrous web made of electroblown nanofibers.

The term "microfibers" as used herein refers to fibers having a diameter from 1.0 μm to 3.0 μm. should it be average or absolute limits?

The term "coarse fibers" as used herein refers to fibers having a diameter of 3.0 μm or more.

By "scrim" is meant a woven or unwoven substrate on which a fibrous web may be attached and/or supported. Melt-blown and spun-bond webs are commonly used as scrim materials.

By "electrets" is meant electrically-charged dielectric articles. Electret is a dielectric material that has a quasi-permanent electric charge or dipole polarization. An electret generates internal and external electric fields, and is the electrostatic analog of a permanent magnet.

The term "stand-alone" used herein in reference to a fibrous web indicates that the web is self-contained and itself has sufficient mechanical integrity for its configuration to be maintained without any supporting substrate such as a scrim.

The term "single source" used herein in reference to a fibrous web indicates that the fibers of the web are all produced in a single spinning process, such that the web formation does not entail the blending of separately-sourced fibers.

By "centrifugal spinning process" is meant any process in which fibers are formed by ejection from a rotating member.

By "spin disk" is meant that a rotating member has a disk shape with a concave, frustoconical or flat open inner surface.

By "spin bowl" is meant that a rotating member has a bowl shape with a surface that may be, without limitation, concave, convex, or frustoconical.

By "filament" is meant an elongated structure that may be formed as a precursor to a fine fiber resulting from attenuation of the filament. Filaments are formed in spinning processes at a discharge point of the rotating member, which may be an edge, serrations or an orifice through which fluid passes.

The term "nozzle-free" is used herein with reference to a process in which the production of filaments, fibrils, or fibers does not entail passage of a spinning fluid or melt through a nozzle or other similar constriction that defines the shape of the exiting fluid, and that no spinning apparatus is used that includes any rotating member having nozzles or other similar constrictions through which a spinning fluid or melt is appointed to pass.

By "air flow field" is meant the vector field that describes the air speed and direction at any point or physical location in the process of the present disclosure.

By "charged" is meant that an object in the process has a net electric charge, positive or negative polarity, relative to uncharged objects or those objects with no net electric charge.

By "discharge point" is meant the location on a spinning member from which fibrils or fibers are ejected. The discharge point may, for example, be an edge, or an orifice through which fibrils are extruded.

The term "specific surface area" used herein in reference to an ensemble of fibers means the total surface area of the fibers in the ensemble divided by the total mass of the fibers.

By "charge density" is a measure of electric charge per unit volume of space, in one, two or three dimensions. More specifically: the linear, surface, or volume charge density is the amount of electric charge per unit length, surface area, or volume, respectively. A relatively large quantity of charge typically accumulates on the locations of greatest curvature.

The term "apparent density" used herein with respect to a fibrous web refers to the mass density, or mass per unit volume, with the volume being that of the free-standing web measured without imposing any external force that would compress the web thickness. For example, a thickness determination may be accomplished by an optical imaging technique that measures the free-standing height of the web. Apparent density may then be calculated by dividing a measured basis weight (i.e., the weight per unit area) of a web by the measured free-standing height of the web.

By "essentially" is meant that if a parameter is held "essentially" at a certain value, then changes in the numerical value that describes the parameter away from that value that do not affect the functioning of the invention are to be considered within the scope of the description of the parameter.

Description

An aspect of the present disclosure is directed toward a nanofibrous web that can be made using techniques such as a centrifugal melt spinning process. In an implementation, the fibers are formed in a process wherein a molten polymeric spinning melt is delivered onto a rapidly rotating member, such as a spin disk or a spin bowl. The melt spreads on an inner surface of the rotating member to form a relatively thin film. Fibrillation occurs, with the formation of discrete, still-molten filaments that are ejected from a discharge edge of the rotating member. These thin filaments or threads are stretched by centrifugal force into fibers having reduced diameters that may be well below 1 μm in diameter. Ordinarily they remain nearly perfectly round. If needed, heat, e.g in the form of heated air, may be supplied in the stretching zone to maintain this stretchability. The stretching process is frequently termed "attenuation"; it occurs in a volume near the spinning apparatus herein termed the "stretching zone."

After exiting the stretching zone, the attenuated fibers pass through a volume termed the "shaping zone" and are collected or "laid down" to form a non-woven, nanofibrous web network. No action is taken during the spinning and laydown process to cut, chop, break, or otherwise define the length of the attenuated fibers, and so they may be of an indefinite length. It is found by direct imaging of the spinning process that at least a large preponderance of fibers remain intact from the point of ejection at least to the point of collection, so that that the fibers are ordinarily at least 30-50 cm, and more commonly at least 1 m long before any spontaneous breakage occurs. In some instances individual fibers may have unbroken lengths well over 1 m or more. Accordingly, the fibers are herein termed "continuous."

The present nanofibrous web comprises fibers of at least one polymer, which may be any melt-spinnable, fiber-forming polymer. Suitable polymers include thermoplastic materials comprising polyolefins, such as polyethylene polymers and copolymers, polypropylene polymers and copolymers; polyesters and co-polyesters, such as poly(ethylene terephthalate), biopolyesters, thermotropic liquid crystal polymers and PET coployesters; polyamides (nylons); polyaramids; polycarbonates; acrylics and meth-acrylics, such as poly(meth)acrylates; polystyrene-based polymers and copolymers; cellulose esters; thermoplastic cellulose; cellulosics; acrylonitrile-butadiene-styrene (ABS) resins; acetals; chlorinated polyethers; fluoropolymers, such as polychlorotrifluoroethylenes (CTFE), fluorinated-ethylene-propylene (FEP); and polyvinylidene fluoride (PVDF); vinyls; biodegradable polymers, bio-based polymers, bi-composite engineering polymers and blends; embedded nanocomposites; natural polymers; and combinations thereof. In various embodiments, the polymer may be polypropylene or a blend of multiple, different polypropylenes.

The polymer used in the present filtration media can further comprise functional additives, either incorporated directly in the fibers or as a coating thereof. The term "functional additives" refers generically to any additive formulated in the polymeric material used to form the fibers of the present nanofibrous web, which materially affects the properties or processing of the present fibers or fibrous web produced therewith. Such additives may include, without limitation, one or more of: a charging promoting agent that enhances the fibers' ability to accept and retain electrostatic charge; an antioxidant; an antimicrobial agent; activated carbon; or other polymer processing enhancement agent. Charging promoting agents that are efficacious for corona charging the polymer in the melt or during fiber attenuation include, without limitation, fatty acide amides and oligomeric hindered amine light stabilizers, such as octadecanamide (CAS No. 124-26-5) and Chimassorb 944 (CAS No. 71878-19-8), respectively.

The operation of the present spinning process is dependent on operating parameters that include temperatures, melt feeding rate, and speed of the rotating member. It has been found that adjustment of these parameters affects the distribution of fiber diameters produced. As further detailed below, it has been found that certain combinations of these operational parameters, together with the geometry of the rotating member and the selection of the polymeric material, result in a surprising and unexpected instability in the spinning melt on the rotating member. Under particular conditions, there is formed a wavy, non-uniform film thickness pattern that is characterized by a dynamic pattern of alternating regions or bands of undulating thickness that extend generally radially outward from the center of the rotating member to its edge. This variation of the thickness of the film results in turn in the ejection of discrete, continuous filaments of varying diameter derived from the film melt, with larger diameter filaments typically produced from regions of higher thickness and smaller diameter filaments from regions of lower thickness. The variation in diameter may persist after the filaments are attenuated into fibers.

In an embodiment, the fibers are deposited onto a horizontal belt collector to form a web media. A continuously advancing conveyor belt or like assembly may be used to collect the non-woven web as it is produced as a sheet of indeterminate length. The sheet may be delivered to equipment appointed to roll it up for convenient further processing or use, transport, or the like.

The presence of larger diameter fibers intimately comingled and entangled with smaller diameter nanofibers is found to be beneficial. In particular, it is believed that the presence of a modest number of microfibers and even coarse fibers creates a structure wherein the larger fibers impart a good web strength and other desirable mechanical properties, while supporting and maintaining a relatively open network in which the nanofibers are disposed. Pore size is thereby increased, beneficially reducing pressure drop in a filtration element. The open structure accommodates a relatively large number of nanofibers that in turn provide the web with a high area of surface that can be electrostatically charged, which is believed to enhance the web structure's ability to capture incident particulates.

In comparison, previous filtration structures have sometimes employed both nanofibers and the larger microfibers and/or coarse fibers, but have segregated them into a filtration layer and a support layer scrim, respectively. Such configurations ordinarily do not afford a network in which the nanofibers are sustained by the larger fibers in a relatively open and fluffy configuration. Instead, the nanofiber filtration layer tends to be more compact, deleteriously decreasing average pore size and increasing air flow resistance.

The open structure of the present nanofibrous web is further believed to permit the web to accept and retain a substantial electrostatic charge. With a large proportion of nanofibers, there is a large surface area that is able to be charged. The open structure is also beneficial, since there is minimal loss of surface area and charging due to the relative paucity of points of fiber tangency. The inclusion of the present continuous melt-spun nanofibers is also believed beneficial over shorter chopped fibers, such melt-spun or solution-spun fibers that may be as short as 1 cm or less. In addition, it is found that in situ charging, as described above, is more effective than post charging processes, wherein the fibers are charged only after they have already been incorporated in a fibrous web The web laydown of fibers into the present non-woven web is facilitated in some embodiments by at least one of a beneficially configured air flow field and an electrostatic charging arrangement. Judicious use of an air flow field helps to direct the fiber in its flight path from ejection to incorporation in the fibrous web. The operational parameters characterizing the air flow field include the air temperatures and air flow speed and direction, e.g., within of the stretching zone and the shaping zone. The air flow field may further comprise air flow in a center zone, which may be delivered through an anti-swirling shield located on the bottom of the rotating apparatus. This center air acts in some embodiments to inhibit an undesirable vortex-like action, wherein the ejected fibers falling downward from the spinning apparatus become entwined and entangled in a narrow zone below, and generally aligned with, an extension of the rotational axis of the spinning structure. Formation of such a vortex tends to inhibit a smooth and uniform laydown. Use of central air in conjunction with a centrifugal melt spinning process is discussed in more detail in WO 2013/096672. Certain aspects of centrifugal melt spinning applicable in the manufacture of the present fibers are also discussed in US Patent Application Publication US2015/0111455A1 to Huang et al. Both these references are incorporated herein in their entirety for all purposes by reference thereto.

In an embodiment, the air flow field in the present process is used solely to direct the flight path of the ejected fibers, ultimately to their collection point, so that the air velocity throughout the field can be maintained at relatively modest values. In contrast, melt blowing processes rely on high velocity air to attenuate the fiber while it is still molten. Thus, far higher air speed, such as 100-200 m/s, is typically required, whereas the fiber direction herein can be accomplished with a gentle flow having a maximum speed of 5 m/s, or even 2 m/s, or even 1 m/s or less. The high speeds employed in melt blowing processes are likely to impede electrostatic charging, e.g., by blowing ions created by the electrostatic field away before they can attach to the fibers being created.

In some embodiments, an electrostatic charge may be given to the individual fibers at one or more stages during the spinning and web collection and assembly process. The charge may be imposed while the polymer is molten on the spinning surface before ejection or in the ejected fiber as it is being attenuated. Charging of a fiber may also occur after the fiber is cooled and already attenuated but before it is assembled into the fibrous web. In other embodiments, charging occurs at any one or more of these stages. The fibers retain electrostatic charge after they are incorporated into the non-woven web of the present disclosure.

For example, the charging may be accomplished by imposition of an electric field. Any high voltage direct current (d.c.) or even alternating current (a.c.) source may be used to supply the electric field. The spinning melt, filaments, or fibers may even be charged by induction from a charge held on or near the collector.

In an implementation, the charging arrangement may comprise electrifying both a corona ring located near the rotating member and the collector belt. Ordinarily, voltages of different sign and magnitude are applied to these locations, with the voltages all referenced to earth ground. The presence of these voltages beneficially results in a finished web that retains an electrostatic charge.

The current drawn in the charging process is expected to be small (preferably less than 10 mA). The source should have variable voltage settings, e.g., 0 kV to 80 kV, preferably −5 kV to −15 kV for corona ring and +50 to +70 kV for collection plate, and preferably (−) and (+) polarity settings to permit adjustments in establishing the electrostatic field It is further found that electrostatic charging is very effectively accomplished while the fibers are relatively close to the melting point, as demonstrated by the method of thermally stimulated currents (TSCs). For polypropylene, the temperature regime for polymer melt and fibril threads to take charging most effectively is around 165° C. to 195° C., so that corona charging is beneficially applied with the fibers in the stretching zone at a temperature in this range, with about 180° C. being preferred. Incorporating a suitable charging agent in melts of non-polar polymers (e.g., polyolefins) further enhances charging near the melting point.

Without being bound by any theory, it is believed that charging the fibers in situ during their production offers benefits not attainable with post charging processes. For example, U.S. Pat. No. 6,375,886 to Angadjivand et al. describes a hydrocharging process wherein high pressure water impinges on a finished web. A relatively high flow rate that can disrupt the web structure is required, and charging, especially of polypropylene, is generally less effective at temperatures below 100° C. than it would be at temperatures at or near the polymer melting point.

Figure 8:
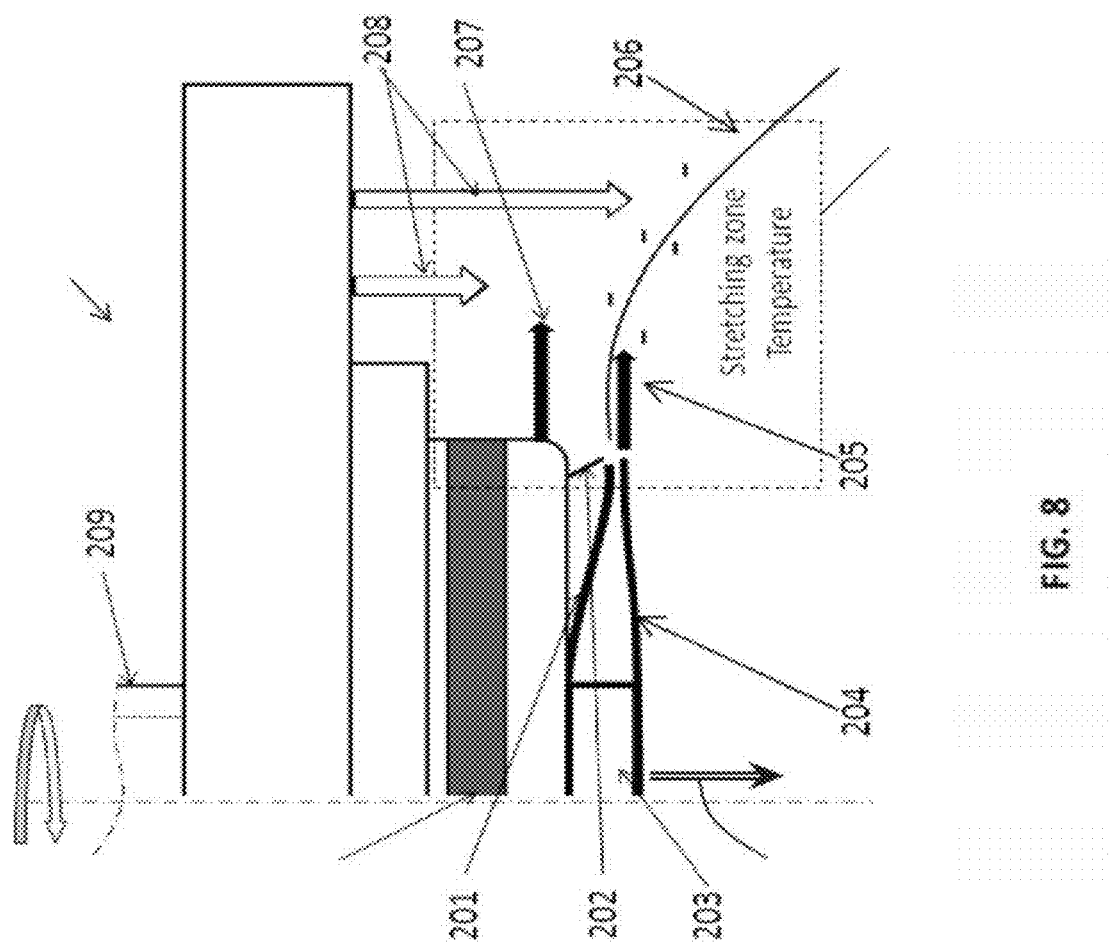
FIG. 8 depicts in cross-sectional view a spinning apparatus that may be used to fabricate the fibers used in the present filtration media.

An implementation of a spinning apparatus useful in manufacturing the present fibers is depicted generally at 200 in FIG. 8. Spinning bowl 202 is mounted on high speed rotating hollow shaft 209. During high speed rotation bowl 202, filaments 206 are ejected at discharge points at the edge of the spinning bowl 202. A protecting shield 201 with approximately the same diameter as spinning bowl 202 is mounted on top of spinning bowl 202 to prevent heat loss from the inner surface of the spinning bowl.

Stationary shield 204 for the spinning bowl is mounted on a stationary shaft through the rotating hollow shaft at the bottom of the spinning bowl to further minimize thermal loss, and to inhibit swirling or twisting of the fiber stream due to a vortex-like effect under the high speed rotating bowl for the uniform web laydown. Optionally, stationary shield 204 includes centrally located ports (not shown) through which a small amount of gently flowing, downwardly directed air 211 is delivered to further inhibit the formation of the undesirable fiber vortex.

A stretching zone 210 surrounding the edge of the rotating bowl is indicated in the dash line rectangle area. The stretching zone temperature is established by the gentle air coming from one or more of three possible heating air streams. One is from the gentle heating air 207 above the spinning bowl; a second is from a stream of gentle heating air 205 coming from a stationary hot air tube within the rotating hollow shaft 209 through the gap between the bottom of the spinning bowl and the stationary shield to reach the stretching zone; a third source of gentle heating air is downward flow 208. The stretching zone temperature is designed and implemented to keep the filaments in the molten state to maximize the stretching or elongation by the centrifugal force. In a possible embodiment, the stretching zone diameter extends to about 1.5 times the diameter of the spin bowl. For spinning polypropylene nanofibers, the stretching zone temperature is preferably optimized around 180° C. to attain good nanofiber spinning and for the fibers to take electrostatic charging as an option. During passage through the stretching zone, the initial filaments are elongated or attenuated to form fibers with smaller diameters that may be well nanofibers with diameters below 1 μm.

The attenuated fibers are deposited on the surface of a horizontal belt collector (not shown). An optional charged corona ring 212 is used to electrostatically charge the filaments 206 being ejected from spinning bowl 202.

The present disclosure is directed in part toward a nanofibrous web and filtration media constructed therewith. The web comprises polymeric fibers that are intimately comingled and entangled in a single layer, stand-alone network. In an implementation, the comingling and entanglement is attained by producing the fibers in a single spinning operation that provides fibers having diameters ranging from below 1 μm (nanofibers) up to 3 μm (microfibers). Preferably coarse fibers having diameter greater than 3 μm are also produced and comingled in the network. The web has an open, fluffy structure indicated by a low apparent density and is electrostatically charged. As a result of the structure and the charging, the web provides a high effective quality factor indicative of its ability to function as a good filtration element.

In an embodiment, the web fibers comprise (by number): (a) at least about 70% nanofibers, about 5%-25% microfibers, and 0 to about 5% coarse fibers. The number average diameter of all the fibers is less than about 1000 nm and a median diameter of all the fibers is less than about 500 nm.

In another embodiment, the web fibers comprise (by number): (a) at least about 70% nanofibers having in combination a number average fiber diameter ranging from a lower limit of 200, 250, 300, 350, 400, 450, 500, 550, 600, 650, or 700 nm to an upper limit of 500, 550, 600, 650, 700, 750, 800, 850, 900, 950, or 1000 nm and a median fiber diameter ranging from a lower limit of 200, 250, 300, 350, or 400 nm to an upper limit of 350, 400, 450, 500, 550, or 600 nm; (b) about 5%-25% microfibers; and (c) 0%-5% coarse fibers, with the proviso that the number average diameter of the nanofibers is greater than the median diameter of the nanofibers. Such embodiments further include ones wherein the ranges of number average fiber diameter and the median fiber diameter are non-overlapping.

In still another embodiment, the web fibers comprise nanofibers, microfibers, and optionally coarse fibers, wherein: (a) the number average diameter of all the fibers ranges from a lower limit of 550, 600, 650, 700, or 750 nm to an upper limit of 800, 850, 900, 950, or 1000 nm and (b) the median diameter of all the fibers ranges from a lower limit of 150, 200, 250, 300, or 350 nm to an upper limit of 400, 450, or 500 nm.

In yet another embodiment, the web fibers fibers comprise nanofibers, microfibers, and coarse fibers, with a mass percentage of the microfibers in a range from about 15% to about 30% and a mass percentage of the coarse fibers in a range from about 50% to about 70%. The fiber surface area within the fibrous web is dominated by area on the nanofibers, so that the percentage of the specific surface area of the nanofibers may be greater than 90% of the specific surface area of the entire fibrous web. Thus, the relative surface charge density on the nanofibers may be about 10 times or more greater than the relative surface charge density of the microfibers.

Embodiments of the present nanofibrous web exhibit an apparent density ranging from a lower limit of 0.01, 0.015, 0.02, 0.025, or 0.03 g/cm$^3$ to an upper limit of 0.035, 0.04, 0.045, or 0.05 g/cm$^3$.

In various embodiments, the nanofibrous web has any one or more of: a basis weight from about 10 g/m$^2$ to about 40 g/m$^2$; a porosity of at least about 94%, 95%, 96%, or 97%; a mean flow pore size in a range from about 8, 9, or 10 μm to about 14, 15, 16, or 18 μm; a ratio of the bubble point and the mean flow pore size of at least about 2, 2.2, or 2.4; and a Frazier air permeability of greater than about 10, 13, 14, or 16 (m$^3$/min)/m$^2$ (and up to about 30, 35, or 40 m$^3$/min)/m$^2$) when measured at an air pressure of 125 N/m$^2$. Typically a Frazier air permeability of at least about 3 (m$^3$/min)/m$^2$, and preferably 10 or more, up to 90 (m$^3$/min)/m$^2$ (approximately 10-300 (ft$^3$/min)/ft$^2$ is regarded as useful for a face mask or respirator.

Embodiments of the present nanofibrous web may have an electrostatic charge of at least +12, +14, +16, or +18 kV measured at a distance of 25 mm, and possibly a charge as large as 20 or 25 kV.

The present nanofibrous web exhibits desirable values of quality factor (QF) and effective quality factor (eQF), which are described below in further detail. Embodiments of the present nanofibrous web may have an effective quality factor (eQF) of at least 2.6, 2.8, or 3.0 (Pa×g/cm$^3$)$^{-1}$, up to 4.5, 4.75, 5, 5.25, 5.5, 5.75, or 6 (Pa×g/cm$^3$)$^{-1}$.

Also contemplated are embodiments of the present nanofibrous web comprising a combination of any two or more of the aforementioned dimensional, physical, or functional characteristics.

In an embodiment, the nanofibrous web is made by a centrifugal melt spinning process.

In another aspect, any of the embodiments of the fibrous web provided herein can be incorporated as a filtration element in a wide variety of respiratory devices including, without limitation, face masks and respirators. The term "respiratory device" refers herein to any device or apparatus worn by a user that is configured such that air to be inhaled by the user is caused to pass first through a filtration element. The term "face mask" refers herein to a structure made of a material having filtration capability that is appointed to be secured generally across a wearer's nose and mouth to mitigate the inhalation or ingestion of undesired, finely divided liquids or solids. Many such face masks are constructed entirely of a flexible fabric or cloth-like fibrous web material (often pleated) with attached bands or straps permitting it to be secured to the wearer. Alternatively, the material may be semi-rigid and have a shape that generally conforms to the wearer's facial structure.

The term "respirator" used herein refers to a structure that includes a filtration element that is integrated with a compliant peripheral material and attached bands or straps, such that the structure seats and seals conformably against the skin of a wearer's face and covers at least the nose and mouth, and optionally the eyes. The respirator is structured so that at least a substantial portion, and preferably all, the air inhaled by the wearer must first pass through the filtration element. Optionally the filtration element is incorporated in a removably attached filtration cartridge that can be either discarded after use or cleaned and reused.

The present fibrous web can be used in constructing a face mask or a respirator or the filtration cartridge associated therewith. Of course, it is also contemplated that the present web can be used in constructing other personal protective equipment that relies on filtration of air inhaled by a user.

Test Methods

In the non-limiting Examples that follow, the following test methods were employed to determine various reported characteristics and properties. Some of these were determined in accordance with published ASTM Standard Test Methods, which are promulgated by ASTM International, West Conshohocken, Pa. Each such ASTM Standard referenced herein is incorporated in its entirety for all purposes by reference thereto.

3D Web Imaging: Scanning electron microscopy (SEM) and other 2D imaging techniques typically give projected images that do not faithfully show how fibers are oriented within a nonwoven article in the depth (thickness) direction or the geometrical and topological features of a nanoweb's pore structure. Hence, 3D volume rendering of nanowebs is vital for understanding the pore structure and the fiber orientation represented in actual nanowebs.

Optical microscopy has not been widely used heretofore for imaging nanowebs, due to diffraction-limitations, as well as noise due to scattering. The characterization of sub-wavelength structures using a microscope is difficult because of the Abbe diffraction limit. Light with wavelength $\lambda$, traveling in a medium with refractive index n and converging to a spot with angle $\theta$ will make a spot with radius $d=\lambda/(2n \sin \theta)$. The denominator ($n \sin \theta$) is called the numerical aperture (NA), which can reach about 1.4 in modern optical devices. Hence, the Abbe limit is roughly $d=\lambda/2$. For green light with wavelength of 500 nm, the Abbe limit is 250 nm. A polymer nanoweb contains nanofibers, some of which may have diameters as small as 250 nm or less. An optical illumination system with a high-aperture cardioid annular condenser and a high numerical aperture makes it possible to get a useful image stack of the nanoweb with a high megapixel digital camera and precise control of vertical resolution (down to 10 nm).

Stacks of images were taken using an automatic z range control with 10 nm to 100 nm resolution. Individually, these images give little information as to how fibers are structurally related. But with a 3D volume image reconstruction algorithm, a stack of images can be transformed into a 3D volume rendering of a nanofibrous web, and the resulting 3D images can be rendered in different view directions. To improve accuracy, the data reported herein were obtained over an area that was expanded from that provided in a single image stack. Hence, stacks of images were taken over an effective image field formed by a three by three array of adjacent individual image fields and suitably combined, thereby increasing the sampling area by a factor of about seven, to roughly 271 µm×210 µm versus 101 µm×81 µm, while still maintaining a manageable file size. FIG. 1 shows a reconstructed 3D image of the nanoweb of Example 1 taken over such an effective image field after enhanced image processing and morphological operations.

Fiber Size Measurements were conducted using SEM. In order to reveal the fiber morphology in different levels of detail, SEM images were taken at nominal magnifications of ×25, ×100, ×250, ×500, ×1,000, ×2,000, ×2,500, ×5,000 and ×10,000. For determining fiber diameter, fibers were counted from at least 2 (up to 10) images at a magnification of ×1,000 or ×2,000. Fibers were counted from each image set until at least about 100 to 200 fibers were individually marked and counted.

Unless otherwise indicated, the total average fiber diameter and median fiber diameter were calculated based on all the fibers counted. Furthermore, the fiber diameter average and median for fiber diameters in the nanofiber, microfiber, and coarse fiber size distributions were also calculated separately.

The number percentage of nanofiber, microfiber, and coarse fiber within the total fiber count was calculated using the sum of all fiber diameters falling within each fiber diameter grouping versus the total fiber count.

The mass percentage of nanofibers, microfibers, and coarse fibers within the total fiber count was calculated using the sum of the mass of all fiber diameters falling within each fiber diameter grouping versus the total mass of all fibers counted. The mass of each fiber was calculated in mass per unit length, with the assumption that all fibers are equal in length and have the same bulk polymer density.

$$\text{Mass}_{fiber\ per\ unit\ length} = V_{fiber\ per\ unit\ length} * \rho_{bulk\ polymer\ density}$$

The volume of each fiber was calculated in volume per unit length, with the assumption that all fibers are equal in length.

$$V_{fiber\ per\ unit\ length} = \pi r_{fiber}^2$$

The surface area percentage of nanofibers, microfibers, and coarse fibers within the total fiber count was calculated using the sum of the surface area of all fiber diameters falling within each fiber diameter grouping versus the total surface area of all fibers counted. The surface area of each fiber was calculated in surface area per unit length, with the assumption that all fibers are equal in length.

$$\text{Surface Area}_{fiber\ per\ unit\ length} = 2\pi r_{fiber}$$

The specific surface area of each fiber was calculated using each fibers surface area per unit length and mass per unit length.

$$\text{Specific Surface Area}_{fiber} = \text{Surface Area}_{fiber\ per\ unit\ length} / \text{Mass}_{fiber\ per\ unit\ length}$$

The specific surface area percentage of nanofibers, microfibers, and coarse fibers within the total fiber count was calculated using the sum of the specific surface area of all fiber diameters falling within each fiber diameter grouping versus the total specific surface area of all fibers counted.

Basis Weight (BW) was determined by in accordance with ASTM D3776/D3776M-09a (2013), "Standard Test Methods for Mass Per Unit Area (Weight) of Fabric," and reported in g/m² or gms. Option C of the ASTM method was used to characterize a handsheet cut to about 10 cm for each web.

Web Thickness was measured using an optical microscopic method. In order to obtain a representative thickness measurement of the selected web examples, a non-contact measurement method was devised in order to preserve each example's web morphology. An Alicona Infinite Focus microscope, which utilizes an automated leveled stage to accurately obtain vertical and horizontal measurements, was used for the calculation of thickness. A 3D scan of each example was conducted to produce a 3D optical surface profile, from which the Alicona software produces a number average surface height (thickness) of the imaged area. This method produces a non-bias and non-damaging measurement of the thickness for each example.

Web Porosity is defined as a ratio of the volume of the fluid space in a filter material divided by the whole volume of the filter material; it can be computed from the measured pore volume and bulk density of the material. The porosity of the sample was calculated from the basis weight and the thickness measurement for each sample. In practice, the basis weight (BW) of the sheet is calculated as the weight of a given sample size (W) divided by the sample area (A). The basis weight of the sample sheet was measured by punching out three samples of a fixed area across the transverse direction of the sheet and weighing them using a standard balance. The volume of this sample size is thus A×δ where δ is the thickness of the sample. Since W is determined only by the weight of the fibers in the sample volume, the solid fraction $\varphi$ is given by $\varphi=BW/\rho\delta$, wherein $\rho$ is the density of the solid polymer. Porosity can then be calculated as $1-\varphi$.

Frazier Air Permeability is a measure of the amount of time required for a certain volume of air to pass through a test specimen. The air pressure is generated by a gravity loaded cylinder that captures an air volume within a chamber using a liquid seal. This pressurized volume of air is directed to the clamping gasket ring, which holds the test specimen. Air that passes through the specimen escapes to atmosphere through holes in the downstream clamping plate. Frazier air permeability measurements were carried out using either a FAP-5390F3 or an FX3300 instrument, both manufactured by Frazier Precision Instrument Co Inc. (Hagerstown, Md.).

In using the FAP-5390F3 instrument, the test specimen is mounted at the sample stand. The pump is so adjusted that the inclined type air pressure gauge shows the pressure of 12.7 cm at the water column by use of the resistor for pressure adjustment use. From the scale indication observed then of the vertical type air pressure gauge and the kind of used orifice, the air amount passes the test specimen, is obtained. The size of the nozzle was varied depending upon the porosity of the material.

In using the FX3300 instrument, a powerful, muffled vacuum pump draws air through an interchangeable test head with a circular opening. For measurement the test head appropriate for the selected test standard is mounted to the instrument. The specimen is clamped over the test head opening by pressing down the clamping arm which automatically starts the vacuum pump. The preselected test pressure is automatically maintained, and after a few seconds the air permeability of the test specimen is digitally displayed in the pre-selected unit of measure. By pressing down the clamping arm a second time the test specimen is released and the vacuum pump is shut-off. Since the vacuum pump is automatically started when the test specimen is clamped in place over the test head opening, the test pressure builds up only after the test specimen has been clamped. The test pressure is digitally pre-selected in accordance with the test standard. It is automatically controlled and maintained by the instrument. Due to a true differential measurement the test pressure is measured accurately, even at high air flow rates. The air flow through the test specimen is measured with a variable orifice. The air permeability of the test specimen is determined from the pressure drop across this orifice, and is digitally displayed in the selected unit of measure for direct reading. High stability, precision pressure sensors provide for an excellent measuring accuracy and reproducibility of the test results.

In this measurement, a pressure difference of 124.5 N/m² is applied to a suitably clamped media sample and the resultant air flow rate is measured as Frazier air permeability and is reported in units of cm³/min/cm². Frazier air permeability was normalized to 34 g/m² basis weight by multiplying the Frazier air permeability by the basis weight and divided by 34 and is reported in cm³/min/cm². High Frazier air permeability corresponds to high air flow permeability and low Frazier air permeability corresponds to low air flow permeability.

Electrostatic Charge (E.S.) is measured using a SIMCO FMX-003 Electrostatic Fieldmeter. The FMX-003 measures static voltages up to +/−22 kV (referenced to earth ground) at a distance of 25 mm.

Mean Flow Pore Size was measured according to ASTM E 1294-89 (1999, now withdrawn), "Standard Test Method for Pore Size Characteristics of Membrane Filters Using Automated Liquid Porosimeter." Individual samples of different size (8 mm diameter) were wetted with the low surface tension fluid as described above and placed in a holder, and a differential pressure of air was applied and the fluid removed from the sample. The differential pressure at which wet flow is equal to one-half the dry flow (flow without wetting solvent) is used to calculate the mean flow pore size using supplied software. Mean flow pore size was reported in μm.

Bubble Point was measured according to ASTM F316-03 (2011), "Standard Test Methods for Pore Size Characteristics of Membrane Filters by Bubble Point and Mean Flow Pore Test." Individual samples (8 mm diameter) were wetted with the low surface tension fluid as described above. After placing the sample in the holder, differential pressure (air) is applied and the fluid was removed from the sample. The bubble point was the first open pore after the compressed air pressure is applied to the sample sheet and is calculated using vendor supplied software.

Filtration Efficiency (FE) and Pressure Drop (ΔP): Media and mask performance are characterized by two main factors, Percent Penetration (P) and Pressure Drop (ΔP). The Percent Penetration represents the fraction of incident particles which penetrate the filter without being removed under a specified testing condition. The same penetration concept can likewise be quantified by the Percent Filtration Efficiency (FE) can be determined from the more easily measured value of P using the relationship $$FE=100-P.$$

Pressure Drop (ΔP) characterizes a filter's resistance to air flow, which is conveniently measured using the test method described in DIN Standard EN 1822 (1998), ΔP is reported in units of pressure, such as mm H₂O/cm² or Pa.

It is known that both P and ΔP vary as a function of the challenge aerosol and its face velocity, so that comparison of data for different samples is proper only if the measurements are done under the same conditions. The challenge aerosol is typically described by variables that include particle (or aerosol) peak size and distribution, the chemistry and form of the aerosol (solid vs. liquid), and the aerosol's charge distribution (neutralized, neutral, or charged). The face velocity is a function of the challenge flow rate used and the surface area of media in the test fixture.

A TSI 8130 Filtration Tester (The Model 8130 Automated Filter Tester) was used to measure filter efficiency and penetration versus particle size. Challenging filters and/or filter media with a known particle size is achieved by using atomizers and the Electrostatic Classifier to generate particles. Upstream and downstream particle detection is accomplished using two Condensation Particle Counters. Fine particle dust-loading tests were conducted on flat-sheet media with a circular opening of 11.3 cm diameter (area=100 $cm^2$). A 2 wt % sodium chloride aqueous solution was used to generate a fine aerosol with a mass mean diameter of 0.26 μm, which was used in the loading test. The air flow rate was 32 liter/min which corresponded to a face velocity of 5.3 cm/s. According to the equipment manufacturer, the aerosol concentration was about 16 mg/$m^3$. Filtration efficiency and initial pressure drop are measured at the beginning of the test and the final pressure drop is measured at the end of the test. The increase in pressure drop is calculated by subtracting the initial pressure drop from the final pressure drop.

Quality Factor and Effective Quality factor: Quality Factor (QF) has frequently been used to compare the performance of different media types, as defined as:

$$QF=-\ln(P/100)/\Delta P,$$

wherein P is penetration and ΔP is pressure drop. Both can be measured by the TSI instrument described above. Quality factor QF can be specified in units of inverse pressure, e.g. $(Pa)^{-1}$, wherein 1 pascal (Pa)=1 N/$m^2$. The thickness, porosity, and fiber diameter of the nanofibrous nonwoven media enter the quality factor (QF) indirectly by their effect on P and ΔP. However, an ideal filtration media would also exhibit low basis weight and low apparent density, to account for the desirability of accomplishing filtration with the smallest possible amount of media. Accordingly, filtration media can further be characterized by an effective quality factor (eQF), which is defined herein as the quality factor divided by apparent density ($\rho_{apparent}$), or:

$$eQF=QF/\rho_{apparent}=(-\ln(P/100)/\Delta P)/\rho_{apparent}$$

Effective quality factor can be specified in units of (Pa×g/$cm^3$)$^{-1}$.

EXAMPLES

The operation and effects of certain embodiments of the present invention may be more fully appreciated from the examples described below. The embodiments on which these examples are based are representative only, and the selection of those embodiments to illustrate aspects of the invention does not indicate that materials, components, reactants, conditions, techniques and/or configurations not described in the examples are not suitable for use herein, or that subject matter not described in the examples is excluded from the scope of the appended claims and equivalents thereof. The significance of the examples is better understood by comparing the results obtained therefrom with the results obtained from certain trial runs that are designed to serve as Comparative Examples 1-8, which provide a basis for such comparison since they provide fibrous webs having different configurations and/or materials, and therefore do not afford the same combination of properties as demonstrated for Examples 1-8 of the present disclosure.

Sample Preparation

Several exemplary nanofibrous web media comprising continuous fibers having a variety of diameters were made using a centrifugal melt spin process. The fiber diameter distributions were obtained using combinations of operating parameters including inter alia temperatures, melt feeding rate and bowl rotating speed, as set forth for each example. These conditions resulted in a melt film instability that produced film regions having different thicknesses that in turn gave rise to ejection of filaments from the rotating member that had a wide range of diameters. A wide range of diameters was found to persist even after attenuated fibers were formed.

The attenuated fibers were laid on a belt collector to form polymer web media. The web laydown of the fibers was controlled by a combination of a suitable air flow field and a charging arrangement. The air flow field is characterized by the air temperatures and air flow rates within the stretching, shaping, and center zones. Charging was accomplished by an electrostatic field resulting from high voltage applied to both a corona ring around the spinning bowl and the collector belt. The web was laid down at a distance below the spin bowl.

Examples in this disclosure were all made under the following general conditions. A PRISM extruder with a gear pump was used to deliver the polymer melt to the rotating spin bowl through the melt transfer line. The extrusion temperature was set at 200° C. The temperature of the spinning melt from the melt transfer line was set to 200° C. the melt feeding rate was 10 gram/min/bowl. The rotating spin bowl was 152.4 mm in diameter. The rotation speed of the spin bowl was set to a constant 10,000 rpm. The induction heating was used to heat up the rotating spin bowl. The stretching zone air flow was set at 150° C. and 8.0 SCFM. The shaping air flow was set at 80° C. and 7.0 SCFM. The center air flow through the hollow rotating shaft and anti-swirling hub was set at 50° C. and 2.5 SCFM. The nanofibrous web was laid down on a belt collector with a laydown distance of 127 mm.

The polymer used in Examples 1-8 was polypropylene (PP) Metocene MF650Y, obtained from LyondellBasell. It has a Mw=75,381 g/mol, melt flow rate=1800 g/10 min (230° C./2.16 kg), and zero shear viscosity of 9.07 Pa·S at 200° C. For Examples 5-8, 1.0 wt % octadecanamide was further added in the extruder as a charging promoting additive for the polypropylene. Octadecanamide (CAS No. 124-26-5), is fatty acid amide having a formula $C_{18}H_{37}NO$ and a chemical name of N-(1,3-Benzodioxol-5-ylmethyl) octadecanamide, a melting point of 98-102° C., and a flash point of 297.34° C. It is alternatively known as Stearamide or Amide $C_{18}$, and was obtained from Sigma-Aldrich.

Other experimental conditions, including the spin bowl temperature, the spin enclosure temperature and humidity, the corona charging voltage and current, the collector belt charging voltage and current, and the collector belt moving speed and the web wind-up speed were selected for each example as listed below. For a given member rotational speed and melt feeding rate, the rotating member's temperature is an important parameter affecting the distribution of fiber diameters produced. The web laydown uniformity and electrostatic charging strength on web were mainly determined by the spin enclosure temperature and humidity, the corona charging voltage and current, the collector belt charging voltage and current, and whether or not a charging additive agent was incorporated in the spinning melt. For given fiber spinning and the web laydown conditions, the basis weight of the resulting web can be adjusted by varying the collector belt moving speed.

Example 1

The specific experimental conditions for making the web of Example 1 included a spin bowl temperature of 206° C., a spin enclosure temperature of 57° C., and a humidity of 13%. The corona charging voltage was −7.0 kV and the current was 0.50 mA, the collector belt charging voltage was +57 kV and current was 0.24 mA. The collector belt moving speed was 0.94 m/min. Example 1 was made as a stand-alone single layer with a basis weight of 30 gsm and a mean flow pore size of 9.3 µm. The single layer media comprised nanofibers about 85.40% in number, 9.26% in mass, 44.04% in surface area, and 97.78% in specific surface area. The single layer media comprised microfibers about 11.68% in number, 30.46% in mass, 32.22% in surface area, and 2.06% in specific surface area. The number average fiber diameter of the total fibers was about 0.655 µm and the median was about 0.331 µm. The number average fiber diameter of the nanofibers was about 0.338 µm and the median was about 0.281 µm. The number average fiber diameter of the microfibers was about 1.808 µm and the median was about 1.667 µm. The number average fiber diameter of the coarse fibers was about 5.330 µm and the median was about 5.435 µm. The web of Example 1 exhibited a filtration efficiency of 99.730% and a resistance of 39.2 Pa. The effective quality factor was 4.07 $(Pa \cdot g/cm^3)^{-1}$.

As described above, the nanofibrous web of Example 1 is depicted schematically in FIG. 1. The intimate comingling and entanglement of the various fibers in a random network is readily visualized.

Example 2

The specific experimental conditions for making the web of Example 2 included a spin bowl temperature of 210° C., a spin enclosure temperature of 56° C., and a humidity of 13%. The corona charging voltage was −7.0 kV and current was 0.48 mA, the collector belt charging voltage was +57 kV and current was 0.24 mA. The collector belt moving speed was 0.94 m/min. The web of Example 2 was made as a stand-alone single layer with a basis weight of 30 gsm and a mean flow pore size of 10.1 µm. The single layer media comprised nanofibers about 89.61% in number, 9.30% in mass, 49.89% in surface area, and 98.63% in specific surface area. The single layer media comprised microfibers about 7.14% in number, 16.98% in mass, 21.16% in surface area, and 1.19% in specific surface area. The single layer media comprised coarse fibers about 3.25% in number, 73.72% in mass, 28.94% in surface area, and 0.18% in specific surface area. The number average fiber diameter of the total fibers was about 0.598 µm and the median was about 0.295 µm. The number average fiber diameter of the nanofibers was about 0.333 µm and the median was about 0.262 µm. The number average fiber diameter of the microfibers was about 1.771 µm and the median was about 1.733 µm. The number average fiber diameter of the coarse fibers was about 5.329 µm and the median was about 4.331 µm. The web of Example 2 exhibited a filtration efficiency of 97.700% and a resistance of 38.2 Pa. The effective quality factor was 2.67 $(Pa \cdot g/cm^3)^{-1}$.

Example 3

The specific experimental conditions for making the web of Example 3 included a spin bowl temperature of 196° C., a spin enclosure temperature of 55.8° C., and a humidity of 14%. The corona charging voltage was −7.5 kV and current was 0.30 mA, the collector belt charging voltage was +51 kV and current was 0.15 mA. The collector belt moving speed was 0.99 m/min. The web of Example 3 was made as a stand-alone single layer with a basis weight of 29 gsm and a mean flow pore size of 13.2 µm. The single layer media comprised nanofibers about 69.91% in number, 7.83% in mass, 32.66% in surface area, and 91.85% in specific surface area. The single layer media comprised microfibers about 24.78% in number, 27.53% in mass, 39.28% in surface area, and 7.67% in specific surface area. The single layer media comprised coarse fibers about 5.31% in number, 64.64% in mass, 28.06% in surface area, and 0.49% in specific surface area. The number average fiber diameter of the total fibers was about 0.953 µm and the median was about 0.559 µm. The number average fiber diameter of the nanofibers was about 0.445 µm and the median was about 0.421 µm. The number average fiber diameter of the microfibers was about 1.511 µm and the median was about 1.487 µm. The number average fiber diameter of the coarse fibers was about 5.038 µm and the median was about 4.763 µm. The web of Example 3 exhibited a filtration efficiency of 97.860% and a resistance of 26.5 Pa. The effective quality factor was 5.45 $(Pa \cdot g/cm^3)^{-1}$.

Example 4

The specific experimental conditions for making the web of Example 4 included a spin bowl temperature of 194° C., a spin enclosure temperature of 54° C., and a humidity of 14%. The corona charging voltage was −7.5 kV and current was 0.34 mA, the collector belt charging voltage was +60 kV and current was 0.28 mA. The collector belt moving speed was 1.17 m/min. Example 4 was made as a stand-alone single layer with a basis weight of 27 gsm and a mean flow pore size of 14.1 µm. The single layer media comprised nanofibers about 73.50% in number, 8.89% in mass, 36.19% in surface area, and 92.99% in specific surface area. The single layer media comprised microfibers about 21.37% in number, 28.86% in mass, 37.58% in surface area, and 6.45% in specific surface area. The single layer media comprised coarse fibers about 5.13% in number, 62.24% in mass, 26.23% in surface area, and 0.56% in specific surface area. The number average fiber diameter of the total fibers was about 0.929 µm and the median was about 0.530 µm. The number average fiber diameter of the nanofibers was about 0.457 µm and the median was about 0.387 µm. The number average fiber diameter of the microfibers was about 1.634 µm and the median was about 1.475 µm. The number average fiber diameter of the coarse fibers was about 4.752 µm and the median was about 4.051 µm. The web of Example 4 exhibited a filtration efficiency of 97.030% and a resistance of 21.6 Pa. The effective quality factor was 5.16 $(Pa \cdot g/cm^3)^{-1}$.

Example 5

The specific experimental conditions for making the web of Example 5 included a spin bowl temperature of 200° C., a spin enclosure temperature of 54.4° C., and a humidity of 13%. The corona charging voltage was −9.0 kV and current was 0.66 mA, the collector belt charging voltage was +60 kV and current was 0.05 mA. The collector belt moving speed was 0.93 m/min. Example 5 was made as a stand-alone single layer with a basis weight of 32 gsm and a mean flow pore size of 9.0 µm. The single layer media comprised nanofibers about 86.24% in number, 11.24% in mass, 50.42% in surface area, and 97.51% in specific surface area. The single layer media comprised microfibers about 11.64% in number, 26.27% in mass, 30.73% in surface area, and 2.35% in specific surface area. The single layer media comprised coarse fibers about 2.12% in number, 62.49% in mass, 18.85% in surface area, and 0.14% in specific surface area. The number average fiber diameter of the total fibers was about 0.659 μm and the median was about 0.364 μm. The number average fiber diameter of the nanofibers was about 0.385 μm and the median was about 0.335 μm. The number average fiber diameter of the microfibers was about 1.740 μm and the median was about 1.479 μm. The number average fiber diameter of the coarse fibers was about 5.870 μm and the median was about 4.292 μm. The web of Example 5 exhibited a filtration efficiency of 99.000% and a resistance of 37.3 Pa. The effective quality factor was 3.11 $(Pa \cdot g/cm^3)^{-1}$.

Example 6

The specific experimental conditions for making the web of Example 6 included a spin bowl temperature of 194° C., a spin enclosure temperature of 57.4° C., and a humidity of 13%. The corona charging voltage was −9.0 kV and current was 0.65 mA, the collector belt charging voltage was +60 kV and current was 0.04 mA. The collector belt moving speed was 1.33 m/min. Example 5 was made as a standalone single layer with a basis weight of 22 gsm and a mean flow pore size of 11.7 μm. The single layer media comprised nanofibers about 81.01% in number, 8.09% in mass, 38.40% in surface area, and 96.84% in specific surface area. The single layer media comprised microfibers about 14.53% in number, 26.48% in mass, 32.94% in surface area, and 2.85% in specific surface area. The single layer media comprised coarse fibers about 4.47% in number, 65.43% in mass, 28.67% in surface area, and 0.31% in specific surface area. The number average fiber diameter of the total fibers was about 0.740 μm and the median was about 0.360 μm. The number average fiber diameter of the nanofibers was about 0.351 μm and the median was about 0.293 μm. The number average fiber diameter of the microfibers was about 1.678 μm and the median was about 1.719 μm. The number average fiber diameter of the coarse fibers was about 4.747 μm and the median was about 4.303 μm. The web of Example 6 exhibited a filtration efficiency of 98.500% and the resistance of 31.4 Pa. The effective quality factor was 3.27 $(Pa \cdot g/cm^3)^{-1}$.

Example 7

The specific experimental conditions for making the web of Example 7 included a spin bowl temperature of 200° C., a spin enclosure temperature of 56.2° C., and a humidity of 13%. The corona charging voltage was −9.0 kV and current was 0.67 mA, the collector belt charging voltage was +60 kV and current was 0.04 mA. The collector belt moving speed was 2.03 m/min. Example 7 was made as a standalone single layer with a basis weight of 14 gsm and a mean flow pore size of 13.2 μm. The single layer media comprised nanofibers about 82.98% in number, 13.05% in mass, 45.87% in surface area, and 96.75% in specific surface area. The single layer media comprised microfibers about 11.17% in number, 24.56% in mass, 24.39% in surface area, and 2.71% in specific surface area. The single layer media comprised coarse fibers about 5.85% in number, 62.39% in mass, 29.73% in surface area, and 0.54% in specific surface area. The number average fiber diameter of the total fibers was about 0.774 μm and the median was about 0.443 μm. The number average fiber diameter of the nanofibers was about 0.428 μm and the median was about 0.393 μm. The number average fiber diameter of the microfibers was about 1.691 μm and the median was about 1.406 μm. The number average fiber diameter of the coarse fibers was about 3.934 μm and the median was about 3.814 μm. The web of Example 7 exhibited a filtration efficiency of 92.200% and the resistance of 17.7 Pa. The effective quality factor was 5.22 $(Pa \cdot g/cm^3)^{-1}$.

Example 8

Example 8 was made by stacking two identical layers of the media of Example 7 with a basis weight of 29 gsm and a mean flow pore size of 9.9 μm. Example 8 had a filtration efficiency of 98.900% and a resistance of 36.3 Pa. The effective quality factor was 4.49 $(Pa \cdot g/cm^3)^{-1}$.

Comparative Example C1

The web of Comparative Example C1 comprised melt blown polypropylene fibers made by a melt blowing process. Such a process is disclosed for example, in U.S. Pat. No. 3,849,241. The meltblown fibers can be formed by extruding a molten thermoplastic material through a plurality of fine, usually circular, die capillaries as molten threads or filaments into converging high velocity heated gas (e.g., air) streams which attenuate the filaments of molten thermoplastic material to reduce their diameter. A high gas velocity (typically 100-200 m/s) is needed to impose sufficient frictional drag force on the fibers to cause the desired attenuation. Thereafter, the meltblown fibers are carried by the high velocity gas stream and are deposited on a collecting surface to form a web of randomly dispersed meltblown fibers.

The web of Comparative Example C1 had a basis weight 50 gsm and a mean flow pore size of 12.1 μm. The single layer media comprised nanofibers about 1.37% in number, 0.14% in mass, 0.50% in surface area, and 3.09% in specific surface area. The single layer media comprised microfibers about 75.34% in number, 37.92% in mass, 58.71% in surface area, and 84.94% in specific surface area. The single layer media comprised coarse fibers about 23.29% in number, 61.93% in mass, 40.79% in surface area, and 11.97% in specific surface area. The number average fiber diameter of the total fibers was about 2.483 μm and the median was about 2.072 μm. Because so few nanofibers were imaged, statistically valid average and median diameters could not be obtained. The number average fiber diameter of the microfibers was about 1.935 μm and the median was about 1.853 μm. The number average fiber diameter of the coarse fibers was about 4.348 μm and the median was about 3.845 μm. Comparative Example C1 had a filtration efficiency of 99.851% and a resistance of 45.1 Pa. The effective quality factor was 1.92 $(Pa \cdot g/cm^3)^{-1}$.

Comparative Example C2

Comparative Example C2 provided a double layered melt blown polypropylene media comprising two identical layers stacked together. Each of the layers had a basis weight of 24 gsm and a mean flow pore size of 14.8 μm. The single layer media comprised nanofibers about 11.03% in number, 1.18% in mass, 4.30% in surface area, and 21.87% in specific surface area. The single layer media comprised microfibers about 73.10% in number, 36.35% in mass, 59.88% in surface area, and 72.29% in specific surface area. The single layer media comprised coarse fibers about 15.89% in number, 62.47% in mass, 35.83% in surface area, and 5.84% in specific surface area. The number average fiber diameter of the total fibers was about 2.131 µm and the median was about 1.780 µm. The number average fiber diameter of the nanofibers was about 0.830 µm and the median was about 0.877 µm. The number average fiber diameter of the microfibers was about 1.745 µm and the median was about 1.695 µm. The number average fiber diameter of the coarse fibers was about 4.812 µm and the median was about 3.934 µm. The single layer media has filtration efficiency of 93.880% and resistance of 19.6 Pa. Comparative Example C2 made with two identical layers has basis weight of 47 gsm, with the mean flow pore size of 11.6 µm. Comparative Example C2 has filtration efficiency of 99.630% and resistance of 41.2 Pa. The effective quality factor was 2.26 $(Pa \cdot g/cm^3)^{-1}$.

Comparative Example C3

Comparative Example C3 comprised two different layers of melt blown polypropylene media. with a combined basis weight of 48 gsm and a mean flow pore size of 15.5 µm. The first layer media comprised nanofibers about 7.29% in number, 0.25% in mass, 1.47% in surface area, and 29.87% in specific surface area. The first layer media comprised microfibers about 55.21% in number, 16.73% in mass, 35.62% in surface area, and 55.18% in specific surface area. The first layer media comprised coarse fibers about 37.50% in number, 83.02% in mass, 62.91% in surface area, and 14.95% in specific surface area. The first layer number average fiber diameter of the total fibers was about 2.949 µm and the median was about 2.400 µm. The first layer number average fiber diameter of the nanofibers was about 0.596 µm and the median was about 0.622 µm. The first layer number average fiber diameter of the microfibers was about 1.903 µm and the median was about 1.845 µm. The first layer number average fiber diameter of the coarse fibers was about 4.948 µm and the median was about 4.333 µm. The second layer media comprised nanofibers about 16.54% in number, 0.85% in mass, 4.66% in surface area, and 39.25% in specific surface area. The second layer media comprised microfibers about 55.64% in number, 17.82% in mass, 38.78% in surface area, and 51.67% in specific surface area. The second layer media comprised coarse fibers about 27.82% in number, 81.33% in mass, 56.56% in surface area, and 9.09% in specific surface area. The second layer number average fiber diameter of the total fibers was about 2.650 µm and the median was about 2.006 µm. The second layer number average fiber diameter of the nanofibers was about 0.746 µm and the median was about 0.788 µm. The second layer number average fiber diameter of the microfibers was about 1.847 µm and the median was about 1.760 µm. The second layer number average fiber diameter of the coarse fibers was about 5.388 µm and the median was about 4.704 µm. The media of Comparative Example C3 exhibited a filtration efficiency of 99.600% and a resistance of 36.3 Pa. The effective quality factor was 1.78 $(Pa \cdot g/cm^3)^{-1}$.

Comparative Example C4

Comparative Example C4 comprised three different layers of melt blown polypropylene media with a combined basis weight of 88 gsm and a mean flow pore size of 9.1 µm. The first layer media comprised nanofibers about 9.24% in number, 0.39% in mass, 2.29% in surface area, and 25.44% in specific surface area. The first layer media comprised microfibers about 54.62% in number, 15.16% in mass, 34.53% in surface area, and 59.18% in specific surface area. The first layer media comprised coarse fibers about 36.13% in number, 84.45% in mass, 63.18% in surface area, and 15.37% in specific surface area. The first layer number average fiber diameter of the total fibers was about 3.147 µm and the median was about 2.225 µm. The first layer number average fiber diameter of the nanofibers was about 0.779 µm and the median was about 0.795 µm. The first layer number average fiber diameter of the microfibers was about 1.989 µm and the median was about 1.924 µm. The first layer number average fiber diameter of the coarse fibers was about 5.503 µm and the median was about 4.970 µm. The second layer media comprised nanofibers about 2.54% in number, 0.19% in mass, 0.78% in surface area, and 6.56% in specific surface area. The second layer media comprised microfibers about 55.08% in number, 19.79% in mass, 36.18% in surface area, and 69.50% in specific surface area. The second layer media comprised coarse fibers about 42.37% in number, 80.06% in mass, 63.05% in surface area, and 23.94% in specific surface area. The second layer number average fiber diameter of the total fibers was about 3.092 µm and the median was about 2.599 µm. The second layer number average fiber diameter of the nanofibers was about 0.944 µm and the median was about 0.986 µm. The second layer number average fiber diameter of the microfibers was about 2.030 µm and the median was about 2.006 µm. The second layer number average fiber diameter of the coarse fibers was about 4.600 µm and the median was about 4.257 µm. The third layer media comprised nanofibers about 24.42% in number, 3.54% in mass, 11.06% in surface area, and 41.34% in specific surface area. The third layer media comprised microfibers about 60.47% in number, 35.08% in mass, 53.25% in surface area, and 53.78% in specific surface area. The third layer media comprised coarse fibers about 15.12% in number, 61.38% in mass, 35.69% in surface area, and 4.88% in specific surface area. The third layer number average fiber diameter of the total fibers was about 1.836 µm and the median was about 1.400 µm. The third layer number average fiber diameter of the nanofibers was about 0.831 µm and the median was about 0.887 µm. The third layer number average fiber diameter of the microfibers was about 1.617 µm and the median was about 1.447 µm. The third layer number average fiber diameter of the coarse fibers was about 4.335 µm and the median was about 4.379 µm. The media of Comparative Example C4 exhibited a filtration efficiency of 99.730% and a resistance of 42.2 Pa. The effective quality factor was 1.81 $(Pa \cdot g/cm^3)^{-1}$.

Comparative Example C5

Comparative Example C5 was a double layered composite media consisting of two identical layers stacked together. The single layer was made by coating about 8 gsm of melt blown polypropylene nanofibers on a 12 gsm PP spunbond scrim. The nanofiber material was made by using the Hills melt blowing equipment according to the process of US20080023888. The spunbond scrim was made using a spun-bond fiber spinning process by extruding molten thermoplastic material as filaments from a plurality of fine capillaries of a spinneret having a circular or other configuration, with the diameter of the extruded filaments then being rapidly reduced in a manner disclosed, for example, in U.S. Pat. No. 4,340,563. Spun-bond fibers are generally continuous and often have average diameter larger than about 10 μm.

The single layer media had a basis weight of 22 gsm and a mean flow pore size of 6.4 μm. The single layer media comprised nanofibers about 72.28% in number, 7.14% in mass, 33.26% in surface area, and 92.10% in specific surface area. The single layer media comprised microfibers about 18.81% in number, 18.72% in mass, 28.08% in surface area, and 6.81% in specific surface area. The single layer media comprised coarse fibers about 8.91% in number, 74.14% in mass, 38.65% in surface area, and 1.09% in specific surface area. The number average fiber diameter of the total fibers was about 1.181 μm and the median was about 0.638 μm. The number average fiber diameter of the nanofibers was about 0.543 μm and the median was about 0.503 μm. The number average fiber diameter of the microfibers was about 1.762 μm and the median was about 1.576 μm. The number average fiber diameter of the coarse fibers was about 5.121 μm and the median was about 4.963 μm. Comparative Example C5 made with two identical layers having a combined basis weight of 43 gsm and a mean flow pore size of 5.2 μm. Despite this relatively small mean flow pore size, Comparative Example C5 has a relatively low filtration efficiency of 87%, because it carried almost no electrostatic charge. Comparative Example C5 also has the relatively higher resistance of 113.8 Pa due to the small pore size and a low effective quality factor of 0.19 $(Pa \cdot g/cm^3)^{-1}$. The high resistance renders this material undesirable for use as a face mask filtration element.

Comparative Example C6

Comparative Example C6 provided a solution electroblown Nylon media obtained from a 24% solution of polyamide-6,6 in formic acid spun into fibers by electroblowing as described in WO 03/080905. Comparative Example C6 had a basis weight of 35 gsm and a mean flow pore size of 2.9 μm. The single layer media comprised nanofibers about 85.21% in number, 16.97% in mass, 55.51% in surface area, and 95.69% in specific surface area. The single layer media comprised microfibers about 11.27% in number, 20.85% in mass, 22.58% in surface area, and 3.91% in specific surface area. The single layer media comprised coarse fibers about 3.52% in number, 62.18% in mass, 21.91% in surface area, and 0.40% in specific surface area. The number average fiber diameter of the total fibers was about 0.765 μm and the median was about 0.506 μm. The number average fiber diameter of the nanofibers was about 0.499 μm and the median was about 0.439 μm. The number average fiber diameter of the microfibers was about 1.534 μm and the median was about 1.336 μm. The number average fiber diameter of the coarse fibers was about 4.763 μm and the median was about 4.093 μm. The media of Comparative Example C6 exhibited a filtration efficiency of 99.726% and a resistance of 217.7 Pa. The effective quality factor was 0.20 $(Pa \cdot g/cm^3)^{-1}$. Comparative Example C6 carried a relatively higher electrostatic charge of +14.8 kV compared to the other comparative examples. Although the Comparative Example C6 media has good filtration efficiency, its high resistance renders this material undesirable for use as a face mask filtration element.

Comparative Example C7

Comparative Example C7 provided a solution electroblown Nylon media obtained from a 24% solution of polyamide-6,6 in formic acid spun into fibers by electroblowing as described in WO 03/080905. Comparative Example C7 had a basis weight of 31 gsm and a mean flow pore size of 1.8 μm. The single layer media comprised nanofibers about 96.07% in number, 49.40% in mass, 81.60% in surface area, and 99.36% in specific surface area. The single layer media comprised microfibers about 3.93% in number, 50.60% in mass, 18.40% in surface area, and 0.64% in specific surface area. The number average fiber diameter of the total fibers was about 0.331 μm and the median was about 0.254 μm. The number average fiber diameter of the nanofibers was about 0.281 μm and the median was about 0.237 μm. The number average fiber diameter of the microfibers was about 1.547 μm and the median was about 1.444 μm. There were no coarse fibers in this comparative example. Comparative Example C7 has filtration efficiency 99.997% and resistance of 381.5 Pa. The effective quality factor was 0.18 $(Pa \cdot g/cm^3)^{-1}$. Comparative Example C7 carried a relatively higher electrostatic charge of +12.6 kV compared to the other comparative examples. Although the Comparative Example C7 media has good filtration efficiency, its high resistance renders this material undesirable for use as a face mask filtration element.

Comparative Example C8

Comparative Example C8 provided a solution electroblown Nylon media obtained from a 24% solution of polyamide-6,6 in formic acid spun into fibers by electroblowing as described in WO 03/080905. Comparative Example C8 had a basis weight of 23 gsm and a mean flow pore size of 4.9 μm. The single layer media comprised nanofibers about 78.57% in number, 8.70% in mass, 50.70% in surface area, and 90.24% in specific surface area. The single layer media comprised microfibers about 19.84% in number, 11.30% in mass, 29.14% in surface area, and 9.64% in specific surface area. The single layer media comprised coarse fibers about 1.59% in number, 80.00% in mass, 20.16% in surface area, and 0.12% in specific surface area. The number average fiber diameter of the total fibers was about 0.955 μm and the median was about 0.680 μm. The number average fiber diameter of the nanofibers was about 0.616 μm and the median was about 0.587 μm. The number average fiber diameter of the microfibers was about 1.402 μm and the median was about 1.392 μm. Because so few coarse fibers were imaged, statistically valid average and median diameters could not be obtained. Comparative Example C8 has filtration efficiency 96.440% and resistance of 86.3 Pa. The effective quality factor was 0.39 $(Pa \cdot g/cm^3)^{-1}$. Comparative Example C8 carried a relatively higher electrostatic charge of +8.5 kV compared to the other comparative examples. Although the Comparative Example C8 media has good filtration efficiency, its high resistance renders this material undesirable for use as a face mask filtration element.

Measured and/or calculated properties of the various fibrous materials of Examples 1-8 and Comparative Examples C1-C8 are collated in Tables 1-4 below. It is noted that Examples 1-8 typically exhibited high values of porosity, Frazier permeability, and electrostatic charge, and low values of apparent density, compared to those of the comparative examples. Even though some of the comparative examples had pore sizes similar to those of Examples 1-8, they also exhibited undesirably higher pressure drops, which are believed to result from less open structures and higher basis weights. All the examples provided excellent electrostatic charging, but especially Examples 5-8, which were prepared with charging promoting additives in the polymer. Examples 1-8 also retained an electrostatic charge of at least +10.0 kV even after further roll to roll processing and storage for 8 months or more.

The present examples also provided effective quality factors that were uniformly higher than those of the comparative examples, rendering them suitable for use as filtration elements in face masks and other respiratory devices.

TABLE 1

Fiber Number Distribution in Media

| | Total Fibers | | Nanofibers [<1 μm] | | | Microfibers [1-3 μm] | | | Coarse Fibers [>3 μm] | | |
|---|---|---|---|---|---|---|---|---|---|---|---|
| | | | | Number | | | Number | | | Number | |
| Example ID | Mean [μm] | Median [μm] | Mean [μm] | Median [μm] | Percentage [%] | Mean [μm] | Median [μm] | Percentage [%] | Mean [μm] | Median [μm] | Percentage [%] |
| 1 | 0.598 | 0.295 | 0.333 | 0.262 | 89.61 | 1.771 | 1.733 | 7.14 | 5.329 | 4.331 | 3.25 |
| 2 | 0.655 | 0.331 | 0.338 | 0.281 | 85.40 | 1.808 | 1.667 | 11.68 | 5.330 | 5.435 | 2.92 |
| 3 | 0.953 | 0.559 | 0.445 | 0.421 | 69.91 | 1.511 | 1.487 | 24.78 | 5.038 | 4.763 | 5.31 |
| 4 | 0.929 | 0.530 | 0.457 | 0.387 | 73.50 | 1.634 | 1.475 | 21.37 | 4.752 | 4.051 | 5.13 |
| 5 | 0.659 | 0.364 | 0.385 | 0.335 | 86.24 | 1.740 | 1.479 | 11.64 | 5.870 | 4.292 | 2.12 |
| 6 | 0.740 | 0.360 | 0.351 | 0.293 | 81.01 | 1.678 | 1.719 | 14.53 | 4.747 | 4.303 | 4.47 |
| 7 | 0.774 | 0.443 | 0.428 | 0.393 | 82.98 | 1.691 | 1.406 | 11.17 | 3.934 | 3.814 | 5.85 |
| 8 | 0.774 | 0.443 | 0.428 | 0.393 | 82.98 | 1.691 | 1.406 | 11.17 | 3.934 | 3.814 | 5.85 |
| C1 | 2.483 | 2.072 | 0.910 | 0.910 | 1.37 | 1.935 | 1.853 | 75.34 | 4.348 | 3.845 | 23.29 |
| C2 | 2.131 | 1.780 | 0.830 | 0.877 | 11.03 | 1.745 | 1.695 | 73.10 | 4.812 | 3.934 | 15.86 |
| C3 | 2.650 | 2.006 | 0.746 | 0.788 | 16.54 | 1.847 | 1.760 | 55.64 | 5.388 | 4.704 | 27.82 |
| C4 | 3.092 | 2.599 | 0.944 | 0.986 | 2.54 | 2.030 | 2.006 | 55.08 | 4.600 | 4.257 | 42.37 |
| C5 | 1.181 | 0.638 | 0.543 | 0.503 | 72.28 | 1.762 | 1.576 | 18.81 | 5.121 | 4.963 | 8.91 |
| C6 | 0.765 | 0.506 | 0.499 | 0.439 | 85.21 | 1.534 | 1.336 | 11.27 | 4.763 | 4.093 | 3.52 |
| C7 | 0.331 | 0.254 | 0.281 | 0.237 | 96.07 | 1.547 | 1.444 | 3.93 | 0.000 | 0.000 | 0.00 |
| C8 | 0.955 | 0.680 | 0.616 | 0.587 | 78.57 | 1.402 | 1.392 | 19.84 | 12.127 | 12.127 | 1.59 |

TABLE 2

Fiber Mass Distribution in Media

| | Nanofibers [<1 μm] | | | Microfibers [1-3 μm] | | | Coarse Fibers [>3 μm] | | |
|---|---|---|---|---|---|---|---|---|---|
| Example ID | Mass (Volume) Percentage [%] | Surface Area Percentage [%] | Specifc Surface Area Percentage [%] | Mass (Volume) Percentage [%] | Surface Area Percentage [%] | Specifc Surface Area Percentage [%] | Mass (Volume) Percentage [%] | Surface Area Percentage [%] | Specifc Surface Area Percentage [%] |
| 1 | 9.30 | 49.89 | 98.63 | 16.98 | 21.16 | 1.19 | 73.72 | 28.94 | 0.18 |
| 2 | 9.26 | 44.04 | 97.78 | 30.46 | 32.22 | 2.06 | 60.28 | 23.74 | 0.16 |
| 3 | 7.83 | 32.66 | 91.85 | 27.53 | 39.28 | 7.67 | 64.64 | 28.06 | 0.49 |
| 4 | 8.89 | 36.19 | 92.99 | 28.86 | 37.58 | 6.45 | 62.24 | 26.23 | 0.56 |
| 5 | 11.24 | 50.42 | 97.51 | 26.27 | 30.73 | 2.35 | 62.49 | 18.85 | 0.14 |
| 6 | 8.09 | 38.40 | 96.84 | 26.48 | 32.94 | 2.85 | 65.43 | 28.67 | 0.31 |
| 7 | 13.05 | 45.87 | 96.75 | 24.56 | 24.39 | 2.71 | 62.39 | 29.73 | 0.54 |
| 8 | 13.05 | 45.87 | 96.75 | 24.56 | 24.39 | 2.71 | 62.39 | 29.73 | 0.54 |
| C1 | 0.14 | 0.50 | 3.09 | 37.92 | 58.71 | 84.94 | 61.93 | 40.79 | 11.97 |
| C2 | 1.18 | 4.30 | 21.87 | 36.35 | 59.88 | 72.29 | 62.47 | 35.83 | 5.84 |
| C3 | 0.85 | 4.66 | 39.25 | 17.82 | 38.78 | 51.67 | 81.33 | 56.56 | 9.09 |
| C4 | 0.19 | 0.78 | 6.56 | 19.76 | 36.18 | 69.50 | 80.06 | 63.05 | 23.94 |
| C5 | 7.14 | 33.26 | 92.10 | 18.72 | 28.08 | 6.81 | 74.14 | 38.65 | 1.09 |
| C6 | 16.97 | 55.51 | 95.69 | 20.85 | 22.58 | 3.91 | 62.18 | 21.91 | 0.40 |
| C7 | 49.40 | 81.60 | 99.36 | 50.60 | 18.40 | 0.64 | 0.00 | 0.00 | 0.00 |
| C8 | 8.70 | 50.70 | 90.24 | 11.30 | 29.14 | 9.64 | 80.00 | 20.16 | 0.12 |

TABLE 3

Media Properties

| Example ID | BW [gsm] | MFP [μm] | BP [μm] | BP/MFP Ratio | Thickness [μm] | Porosity [%] | Apparent Density [g/cm$^3$] | Frazier [(m$^3$/min)/m$^2$] | E.S. Charge [kV] |
|---|---|---|---|---|---|---|---|---|---|
| 1 | 30 | 9.3 | 20.5 | 2.2 | 814 | 96.13 | 0.0371 | 10.49 | +17.4 |
| 2 | 30 | 10.1 | 23.4 | 2.3 | 816 | 95.78 | 0.0369 | 10.79 | +16.8 |
| 3 | 29 | 13.2 | 31.8 | 2.4 | 1074 | 95.90 | 0.0266 | 15.91 | +12.8 |
| 4 | 27 | 14.1 | 30.7 | 2.2 | 850 | 95.95 | 0.0316 | 12.92 | +12.8 |
| 5 | 32 | 9.0 | 19.6 | 2.2 | 795 | 95.10 | 0.0398 | 11.00 | +18.6 |

TABLE 3-continued

Media Properties

| Example ID | BW [gsm] | MFP [μm] | BP [μm] | BP/MFP Ratio | Thickness [μm] | Porosity [%] | Apparent Density [g/cm³] | Frazier [(m³/min)/m²] | E.S. Charge [kV] |
|---|---|---|---|---|---|---|---|---|---|
| 6 | 22 | 11.7 | 22.8 | 1.9 | 534 | 94.93 | 0.0410 | 14.36 | +18.2 |
| 7 | 14 | 13.2 | 27.4 | 2.1 | 515 | 96.65 | 0.0277 | 23.26 | +18.4 |
| 8 | 29 | 9.9 | 20.9 | 2.1 | 1031 | 97.65 | 0.0277 | 16.37 | +18.4 |
| C1 | 50 | 12.1 | 22.1 | 1.8 | 664 | 91.55 | 0.0751 | 9.94 | +3.6 |
| C2 | 47 | 11.6 | 22.4 | 1.9 | 789 | 93.54 | 0.0602 | 12.28 | +1.6 |
| C3 | 48 | 15.5 | 27.5 | 1.8 | 563 | 90.89 | 0.0854 | 6.74 | +5.7 |
| C4 | 88 | 9.1 | 19.4 | 2.1 | 1138 | 91.35 | 0.0777 | 6.31 | +1.6 |
| C5 | 43 | 5.2 | 11.8 | 2.3 | 456 | 90.02 | 0.0947 | 4.24 | 0 |
| C6 | 35 | 2.9 | 5.2 | 1.8 | 256 | 88.14 | 0.1368 | 2.16 | +14.8 |
| C7 | 31 | 1.8 | 3.3 | 1.9 | 209 | 87.06 | 0.1483 | 1.13 | +12.6 |
| C8 | 23 | 4.9 | 8.0 | 1.6 | 226 | 91.44 | 0.0996 | 6.10 | +8.5 |

TABLE 4

Air Filtration Properties

| Sample ID | BW [gsm] | Apparent Density [g/cm³] | ΔP [Pa] | P [%] | FE [%] | QF = —ln(P/100)/ΔP [1/Pa] | eQF = QF/App. Den. [1/(Pa · g/cm³)] |
|---|---|---|---|---|---|---|---|
| 1 | 30 | 0.0371 | 39.2 | 0.270 | 99.730 | 0.151 | 4.07 |
| 2 | 30 | 0.0369 | 38.2 | 2.300 | 97.700 | 0.099 | 2.67 |
| 3 | 29 | 0.0266 | 26.5 | 2.140 | 97.860 | 0.145 | 5.45 |
| 4 | 27 | 0.0316 | 21.6 | 2.970 | 97.030 | 0.163 | 5.16 |
| 5 | 32 | 0.0398 | 37.3 | 1.000 | 99.000 | 0.124 | 3.11 |
| 6 | 22 | 0.0410 | 31.4 | 1.500 | 98.500 | 0.134 | 3.27 |
| 7 | 14 | 0.0277 | 17.7 | 7.800 | 92.200 | 0.145 | 5.22 |
| 8 | 29 | 0.0277 | 36.3 | 1.100 | 98.900 | 0.124 | 4.49 |
| C1 | 50 | 0.0751 | 45.1 | 0.149 | 99.851 | 0.144 | 1.92 |
| C2 | 47 | 0.0602 | 41.2 | 0.370 | 99.630 | 0.136 | 2.26 |
| C3 | 48 | 0.0854 | 36.3 | 0.400 | 99.600 | 0.152 | 1.78 |
| C4 | 88 | 0.0777 | 42.2 | 0.270 | 99.730 | 0.140 | 1.81 |
| C5 | 43 | 0.0947 | 113.8 | 12.80 | 87.200 | 0.018 | 0.19 |
| C6 | 35 | 0.1368 | 217.7 | 0.274 | 99.726 | 0.027 | 0.20 |
| C7 | 31 | 0.1483 | 381.5 | 0.003 | 99.997 | 0.027 | 0.18 |
| C8 | 23 | 0.0996 | 86.3 | 3.560 | 96.440 | 0.039 | 0.39 |

Having thus described the invention in rather full detail, it will be understood that this detail need not be strictly adhered to but that further changes and modifications may suggest themselves to one skilled in the art, all falling within the scope of the invention as defined by the subjoined claims.

Where a range of numerical values is recited or established herein, the range includes the endpoints thereof and all the individual integers and fractions within the range, and also includes each of the narrower ranges therein formed by all the various possible combinations of those endpoints and internal integers and fractions to form subgroups of the larger group of values within the stated range to the same extent as if each of those narrower ranges was explicitly recited. Where a range of numerical values is stated herein as being greater than a stated value, the range is nevertheless finite and is bounded on its upper end by a value that is operable within the context of the invention as described herein. Where a range of numerical values is stated herein as being less than a stated value, the range is nevertheless bounded on its lower end by a non-zero value. When an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed.

In this specification, unless explicitly stated otherwise or indicated to the contrary by the context of usage, where an embodiment of the subject matter hereof is stated or described as comprising, including, containing, having, being composed of, or being constituted by or of certain features or elements, one or more features or elements in addition to those explicitly stated or described may be present in the embodiment. An alternative embodiment of the subject matter hereof, however, may be stated or described as consisting essentially of certain features or elements, in which embodiment features or elements that would materially alter the principle of operation or the distinguishing characteristics of the embodiment are not present therein. A further alternative embodiment of the subject matter hereof may be stated or described as consisting of certain features or elements, in which embodiment, or in insubstantial variations thereof, only the features or elements specifically stated or described are present. Additionally, the term "comprising" is intended to include examples encompassed by the terms "consisting essentially of" and "consisting of." Similarly, the term "consisting essentially of" is intended to include examples encompassed by the term "consisting of."

In this specification, unless explicitly stated otherwise or indicated to the contrary by the context of usage, amounts, sizes, ranges, formulations, parameters, and other quantities and characteristics recited herein, particularly when modified by the term "about," may but need not be exact, and may also be approximate and/or larger or smaller (as desired) than stated, reflecting tolerances, conversion factors, rounding off, measurement error, and the like, as well as the inclusion within a stated value of those values outside it that have, within the context of this invention, functional and/or operable equivalence to the stated value.

What is claimed is:

1. A nanofibrous web comprising polymeric fibers that are intimately comingled and entangled in a single layer, stand-alone network, and wherein:
   (a) the fibers comprise at least 70% nanofibers, 5%-25% microfibers, and up to 5% coarse fibers by number percentage;
   (b) a number average diameter of all the fibers is less than 1000 nm and a median diameter of all the fibers is less than 500 nm; and
   (c) the nanofibrous web has an apparent density of 0.01 to 0.05 g/cm$^3$, an electrostatic charge of at least 12 kV as measured at a distance of 25 mm, and an effective quality factor (eQF) of greater than about 2.5 (Pa·g/cm$^3$)$^{-1}$.

2. The nanofibrous web of claim 1, wherein the fibers are composed of a polyolefin.

3. The nanofibrous web of claim 2, wherein the polyolefin comprises a polypropylene or a blend of multiple, different polypropylenes.

4. The nanofibrous web of claim 2, wherein the polyolefin comprises a charging promoting agent.

5. The nanofibrous web of claim 1, wherein the number average diameter of all the fibers ranges from 600 nm to 1000 nm and the median diameter of all the fibers ranges from 300 nm to 500 nm.

6. The nanofibrous web of claim 1, wherein the nanofibers have a number average fiber diameter ranging from 330 nm to 450 nm and a median fiber diameter ranging from 260 nm to 420 nm.

7. The nanofibrous web of claim 1, wherein (a) a mass percentage of the microfibers ranges from 15% to 30%; and (b) a mass percentage of the coarse fibers ranges from 50% to 70%.

8. The nanofibrous web of claim 1, wherein the percentage of the specific surface area of the nanofibers is greater than 90%.

9. The nanofibrous web of claim 1, wherein the relative surface charge density of the nanofibers is about 10 times greater than the relative surface charge density of the microfibers.

10. The nanofibrous web of claim 1, wherein the nanofibrous web has a porosity of at least about 94%.

11. The nanofibrous web of claim 1, wherein a mean flow pore size ranges from 9 μm to 15 μm.

12. The nanofibrous web of claim 1, wherein a Frazier air permeability is greater than about 10 (m$^3$/min)/m$^2$ as measured at a pressure of 125 N/m$^2$.

13. The nanofibrous web of claim 1, wherein the nanofibrous web has a basis weight from 10 g/m$^2$ to 40 g/m$^2$.

14. The nanofibrous web of claim 1, wherein the electrostatic charge ranges from +14 kV to +20 kV as measured at a distance of 25 mm.

15. The nanofibrous web of claim 1, wherein the nanofibrous web is made by a centrifugal melt spinning process.

16. A respiratory device comprising a filtration element comprising the nanofibrous web of claim 1.

17. The respiratory device of claim 16, wherein the respiratory device is a face mask.

18. A process for producing a nanofibrous web, comprising:
   (i) supplying a molten polymeric spinning melt to a surface of a rotating member having a discharge edge;
   (ii) rotating the rotating member at a rotational speed sufficient to form a film of the melt on the member, the film having an instability characterized by a wavy, non-uniform film thickness having regions of undulating thickness that extend radially outward from the center of the rotating member to its edge;
   (iii) discharging from the discharge edge a plurality of discrete, continuous filaments derived from the film melt into a stretching zone;
   (iv) attenuating the discharged discrete filaments in the stretching zone by centrifugal force to form continuous fibers;
   (v) electrostatically charging the filaments in the stretching zone; and
   (vi) collecting the attenuated continuous fibers on a collection surface to form the nanofibrous web as a single layer, stand-alone network,
   and wherein the fibers comprise at least 70% nanofibers, 5%-25% microfibers, and up to 5% coarse fibers by number percentage, and a number average diameter of all the fibers is less than 1000 nm and a median diameter of all the fibers is less than 500 nm.

* * * * *